(12) United States Patent
Watt et al.

(10) Patent No.: US 7,708,251 B2
(45) Date of Patent: May 4, 2010

(54) MECHANISM AND METHOD FOR ADJUSTING SEAT HEIGHT FOR EXERCISE EQUIPMENT

(75) Inventors: Jonathan B. Watt, Broomfield, CO (US); Jonathan Harrach-Salazar, Erie, CO (US); Mark N. Holtan, Louisville, CO (US)

(73) Assignee: Nautilus, Inc., Vancouver, WA (US)

( * ) Notice: Subject to any disclaimer, the term of this patent is extended or adjusted under 35 U.S.C. 154(b) by 314 days.

(21) Appl. No.: 11/378,979

(22) Filed: Mar. 17, 2006

(65) Prior Publication Data

US 2007/0215781 A1   Sep. 20, 2007

(51) Int. Cl.
*F16M 11/00*   (2006.01)

(52) U.S. Cl. ............... 248/407; 248/408; 297/215.13; 482/63

(58) Field of Classification Search ............... 248/408, 248/407; 297/215.13, 195; 482/63, 119, 482/51–52; 280/287, 274
See application file for complete search history.

(56) References Cited

U.S. PATENT DOCUMENTS

| | | | |
|---|---|---|---|
| 510,993 A | 12/1893 | Riess | |
| 585,719 A | 7/1897 | Sutton | |
| 2,644,504 A | 7/1953 | Vick | |
| 2,741,299 A | 4/1956 | Bergen | |
| 3,554,585 A | 1/1971 | Sorenson | |
| 3,854,428 A * | 12/1974 | Fullenkamp | 108/146 |
| 3,858,428 A * | 1/1975 | Thompson | 72/363 |
| 4,034,426 A * | 7/1977 | Hardwick et al. | 4/564.1 |
| 4,113,221 A | 9/1978 | Wehner | |
| 4,150,851 A | 4/1979 | Cienfuegos | |
| 4,174,546 A * | 11/1979 | Ohtake | 4/420 |
| 4,339,104 A | 7/1982 | Weidman | |
| D283,431 S | 4/1986 | Gustafsson | |
| 4,589,656 A | 5/1986 | Baldwin | |
| D285,953 S | 9/1986 | Gustafsson | |
| D291,462 S | 8/1987 | Aalto | |
| 4,712,789 A | 12/1987 | Brilando | |
| 4,712,790 A | 12/1987 | Szymski | |

(Continued)

FOREIGN PATENT DOCUMENTS

FR   2108579   5/1972

OTHER PUBLICATIONS

Advertisement: aerobika; *Giugiaro Tresbispin "Safety"*, 1 page, Apr. 23, 1998.

(Continued)

*Primary Examiner*—Amy J Sterling
(74) *Attorney, Agent, or Firm*—Dorsey & Whitney LLP

(57) ABSTRACT

The present invention is a seat height adjustment mechanism for exercise equipment having a seat. Examples of such exercise equipment include: stationary exercise bicycles; road or mountain type bicycles; resistance strength training supporting racks or platforms (e.g., preacher curl benches, military or shoulder press racks, etc.) for use with free weights; and resistance strength training machines that employ as resistance weight plates, deflectable members, elastic bands, springs, hydraulic cylinders, pneumatic cylinders, etc. The mechanism comprises a member, a telescopic member, and an engagement member. The member extends upwardly and includes a rack. The telescopic member includes a first end telescopically received in the member and a seat end. The engagement member is coupled to the telescopic member and adapted to engage the rack.

14 Claims, 36 Drawing Sheets

U.S. PATENT DOCUMENTS

| | | | |
|---|---|---|---|
| 4,756,496 A | 7/1988 | Hosan et al. | |
| 4,756,796 A * | 7/1988 | Saitou | 264/162 |
| 4,757,988 A | 7/1988 | Szymski | |
| 4,772,069 A | 9/1988 | Szymski | |
| D299,732 S | 2/1989 | Gustafsson | |
| 4,807,856 A | 2/1989 | Teckenbrock | |
| 4,824,102 A | 4/1989 | Lo | |
| 4,955,599 A | 9/1990 | Bersonnet et al. | |
| 5,011,174 A | 4/1991 | Ross-Clunis | |
| 5,016,870 A | 5/1991 | Bulloch et al. | |
| 5,048,824 A | 9/1991 | Chen | |
| D325,946 S | 5/1992 | Cesaroni et al. | |
| 5,180,131 A | 1/1993 | Few | |
| 5,346,235 A | 9/1994 | Holman | |
| D357,953 S | 5/1995 | Warehime et al. | |
| 5,433,552 A | 7/1995 | Thyu | |
| 5,439,267 A * | 8/1995 | Peterson et al. | 297/411.36 |
| 5,513,895 A | 5/1996 | Olson et al. | |
| D380,796 S | 7/1997 | Wang et al. | |
| D382,924 S | 8/1997 | Wu | |
| D382,925 S | 8/1997 | Wu | |
| 5,657,958 A | 8/1997 | McLaughlin et al. | |
| 5,769,005 A * | 6/1998 | Haynes | 108/116 |
| 5,779,249 A | 7/1998 | Lin | |
| 5,795,026 A * | 8/1998 | Dral et al. | 297/411.36 |
| 5,901,658 A | 5/1999 | Kirkland | |
| 5,947,873 A | 9/1999 | Sands et al. | |
| 5,961,424 A | 10/1999 | Warner et al. | |
| 5,992,815 A * | 11/1999 | Metzdorf et al. | 248/631 |
| 6,022,077 A | 2/2000 | Kirkland et al. | |
| 6,079,786 A | 6/2000 | Kirkland et al. | |
| 6,082,680 A | 7/2000 | Woodward et al. | |
| 6,102,354 A * | 8/2000 | Thorn | 248/406.2 |
| 6,138,973 A | 10/2000 | Woodward | |
| 6,176,459 B1 | 1/2001 | Wilcox et al. | |
| 6,354,557 B1 | 3/2002 | Walsh | |
| 6,533,708 B2 | 3/2003 | Taggett | |
| 6,557,679 B1 | 5/2003 | Warner et al. | |
| 6,585,215 B2 | 7/2003 | Duncan | |
| 6,612,970 B2 | 9/2003 | Forcillo | |
| 6,641,507 B1 | 11/2003 | Warner et al. | |
| 6,669,603 B1 | 12/2003 | Forcillo | |
| 6,843,534 B2 * | 1/2005 | Lee et al. | 297/411.35 |
| 6,913,315 B2 * | 7/2005 | Ball et al. | 297/284.7 |
| 6,913,560 B2 * | 7/2005 | Ryan et al. | 482/51 |
| 7,017,872 B2 * | 3/2006 | Hogle et al. | 248/162.1 |
| 7,172,532 B2 | 2/2007 | Baker | |
| 7,175,570 B2 | 2/2007 | Lull et al. | |
| 2002/0077221 A1 | 6/2002 | Dalebout et al. | |
| 2002/0151414 A1 | 10/2002 | Baker | |
| 2003/0171190 A1 | 9/2003 | Rice | |
| 2003/0171191 A1 | 9/2003 | Crawford et al. | |
| 2004/0248702 A1 | 12/2004 | Baker | |
| 2005/0239610 A1 | 10/2005 | Ryan et al. | |

OTHER PUBLICATIONS

Brochure: Schwinn Cycling & Fitness Inc., *Johnny G. Spinner*, by Schwinn, Go Fast standing still, 4 pages, 1995.

Catalog: *Schwinn® Fitness Equipment*, 10 pages, available as early as 1985.

Catalog: *Schwinn® Fitness Catalog*, 14 pages, available as early as 1987.

Catalog: *1990 Schwinn Full-Line Fitness Catalog*, 16 pages, 1990.

Catalog: *Schwinn Fitness*, 16 pages, available as early as 1991.

Catalog: *The 1993 Schwinn Fitness Line*, 14 pages, 24 pages, available as early as 1993.

Catalog: *93 New Bikes, New Thinking*, 36 pages, available as early as 1993.

Catalog: Schwinn® Fitness, Harness the Force of Nature and You Possess the Strength of Confidence brochure 32 pages, 1996-1997.

Catalog: *Schwinn Fitness Equipment a change of shape*, available as early as 1995.

Catalog: *Schwinn Fitness Equipment*, 6 pages, date unknown.

PCT International Search Report and PCT Written Opinion for corresponding PCT International Application No. PCT/US07/63320 dated Jul. 23, 2008, 5 pages.

U.S. Appl. No. 12/723,492, dated Mar. 19, 2010, Watt et al.

\* cited by examiner

MECHANISM AND METHOD FOR ADJUSTING SEAT HEIGHT FOR EXERCISE EQUIPMENT

FIELD OF THE INVENTION

The present invention relates to exercise equipment and methods of adjusting exercise equipment. More specifically, the present invention relates to seat height adjustment mechanisms for exercise equipment and methods of adjusting seat height for such equipment.

BACKGROUND OF THE INVENTION

Exercisers utilize exercise machines and equipment to achieve many health benefits in a safe, efficient and fun manner. For example, exercise machines and equipment are used to reduce body fat and to increase strength, speed, lean muscle mass, and cardiovascular health. Due to their popularity, exercise machines and equipment are found in commercial fitness centers and homes in many nations of the world.

Exercise machines and equipment often employ a seat to support the exerciser while exercising. Examples of such exercise machines and equipment include: stationary exercise bicycles; road or mountain type bicycles; resistance strength training supporting racks or platforms (e.g., preacher curl benches, military or shoulder press racks, etc.) for use with free weights; and resistance strength training machines that employ as resistance weight plates, deflectable members, elastic bands, springs, hydraulic cylinders, pneumatic cylinders, etc.

In the context of exercising with a bicycle, proper seat height is necessary to optimize the exercise benefit and to prevent knee and other injuries. Similarly, in the context of exercising with a resistance strength-training platform, rack or machine, proper seat height is necessary to properly position the exerciser in the exercise station to optimize the exercise benefit and to prevent injury.

Existing seat height adjustment mechanisms for bicycles and resistance strength training equipment typically offer incremental height adjustment capabilities that are inadequate to allow a seat height to be tailored to an exerciser's needs. Additionally, existing seat height adjustment mechanisms are awkward, if not outright impossible, to adjust when an exerciser is seated on the bicycle or the resistance strength training equipment, which is an optimum way of setting proper seat height.

There is a need in the art for a seat height adjustment mechanism that allows an exerciser to easily and comfortably adjust the seat height for exercise equipment. There is also a need in the art for an easy and convenient method of adjusting the seat height for exercise equipment.

BRIEF SUMMARY OF THE INVENTION

The present invention, in one embodiment, is a seat height adjustment mechanism for exercise equipment having a seat. Examples of such exercise equipment include: stationary exercise bicycles; road or mountain type bicycles; resistance strength training supporting racks or platforms (e.g., preacher curl benches, military or shoulder press racks, etc.) for use with free weights; and resistance strength training machines that employ as resistance weight plates, deflectable members, elastic bands, springs, hydraulic cylinders, pneumatic cylinders, etc. The mechanism comprises a member, a telescopic member, and an engagement member. The member extends upwardly and includes a rack. The telescopic member includes a first end telescopically received in the member and a seat end. The engagement member is coupled to the telescopic member and adapted to engage the rack.

The present invention, in one embodiment, is a method of adjusting seat height for exercise equipment having a seat. The method comprises pivoting an engagement member relative to a telescopic member on which the engagement member is mounted, and displacing the engagement member along a rack inside a housing member receiving the telescopic member.

The present invention, in one embodiment, is exercise equipment comprising a seat and a seat height adjustment mechanism. The mechanism includes a member extending upwardly from the exercise equipment, a telescopic member, and a handle. The telescopic member includes a first end telescopically received in the housing member and a second end coupled to the seat. The handle is proximate to, and moveable with, the seat. The handle is displaceable to actuate the mechanism.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

DETAILED DESCRIPTION a. Overview

Figure 1A:
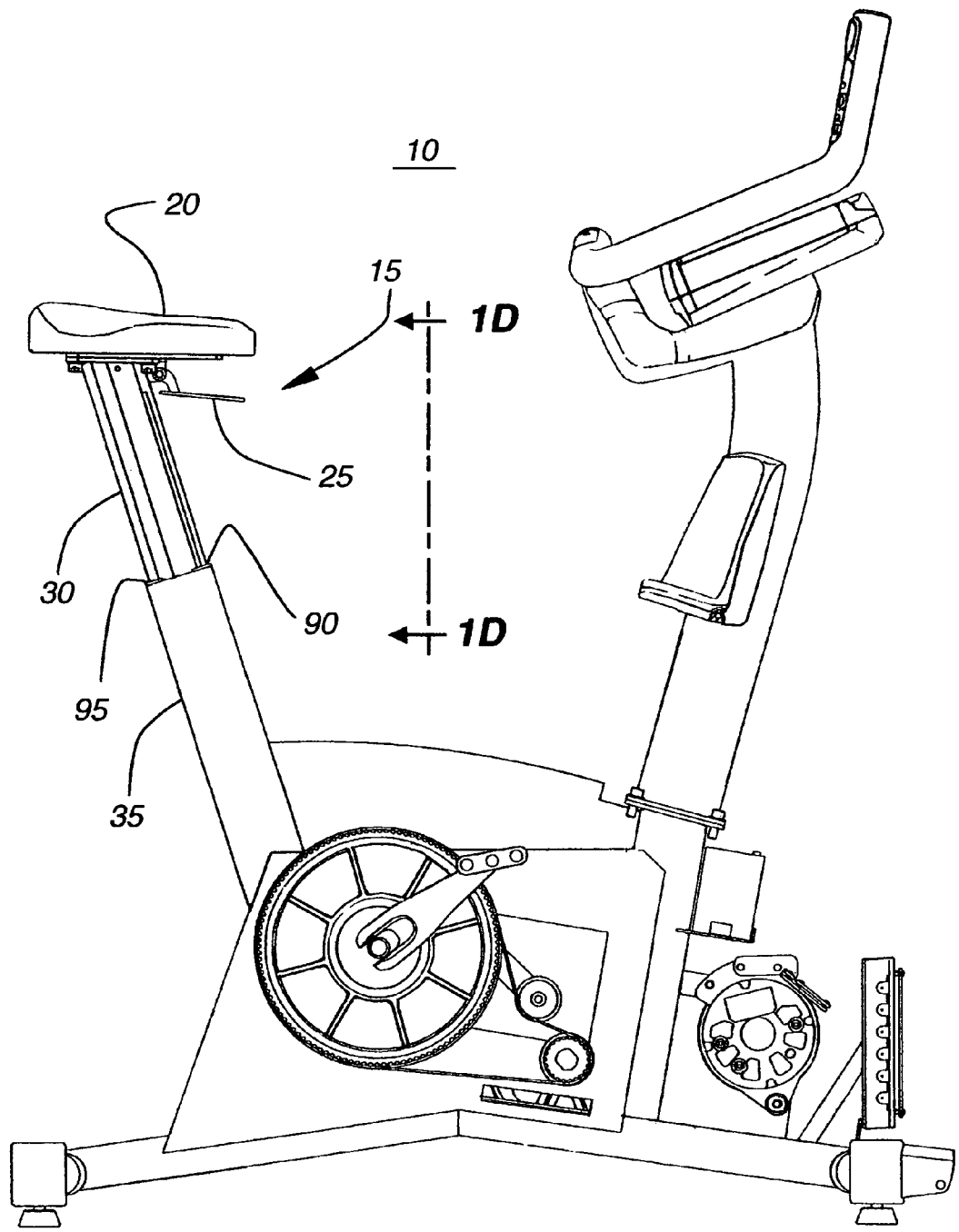
FIG. 1A is a side elevation of a stationary exercise bicycle employing a seat height adjustment mechanism.
Figure 1B:
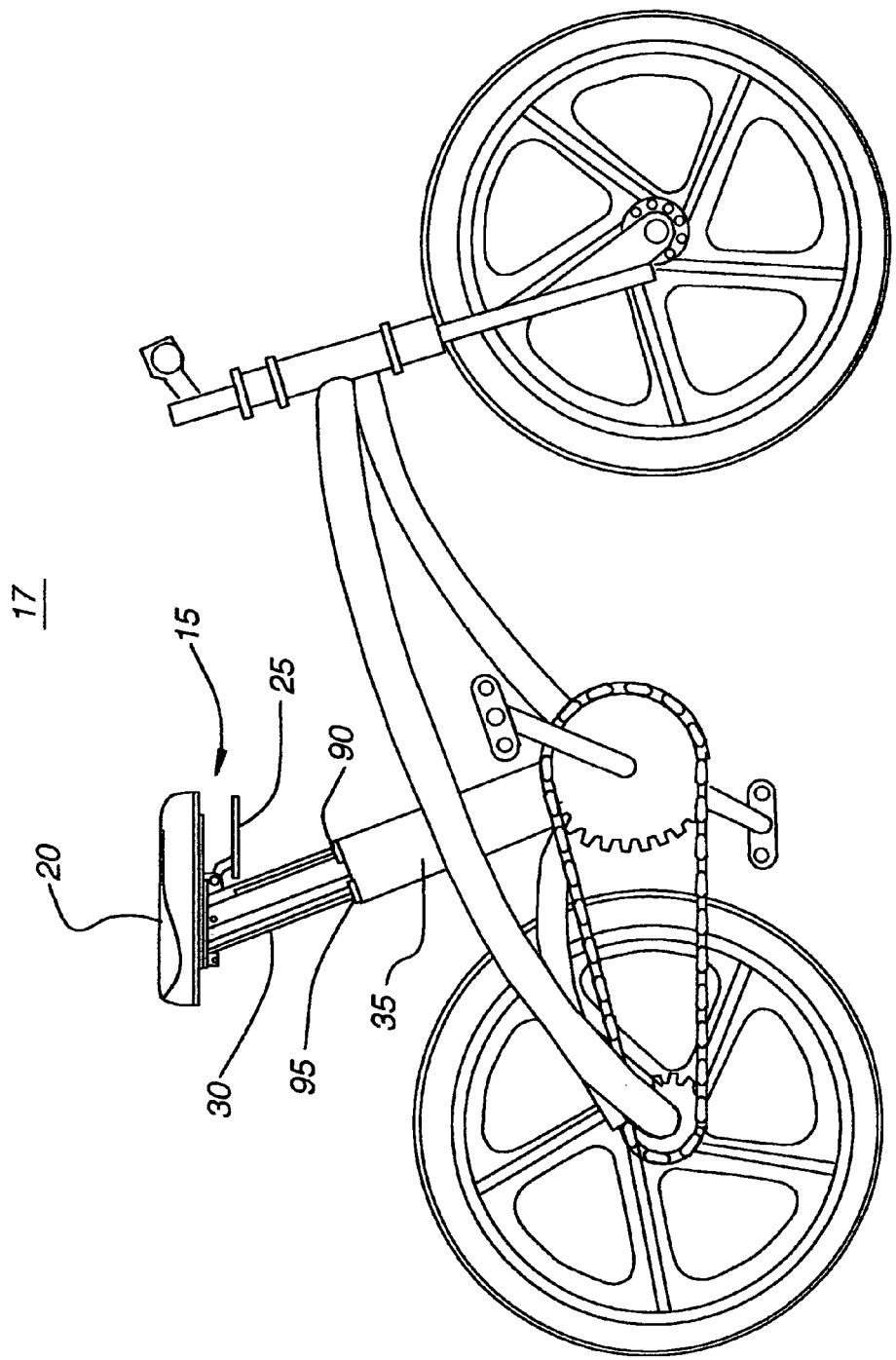
FIG. 1B is a side elevation of a road or mountain type bicycle employing the seat height adjustment mechanism.
Figure 1C:
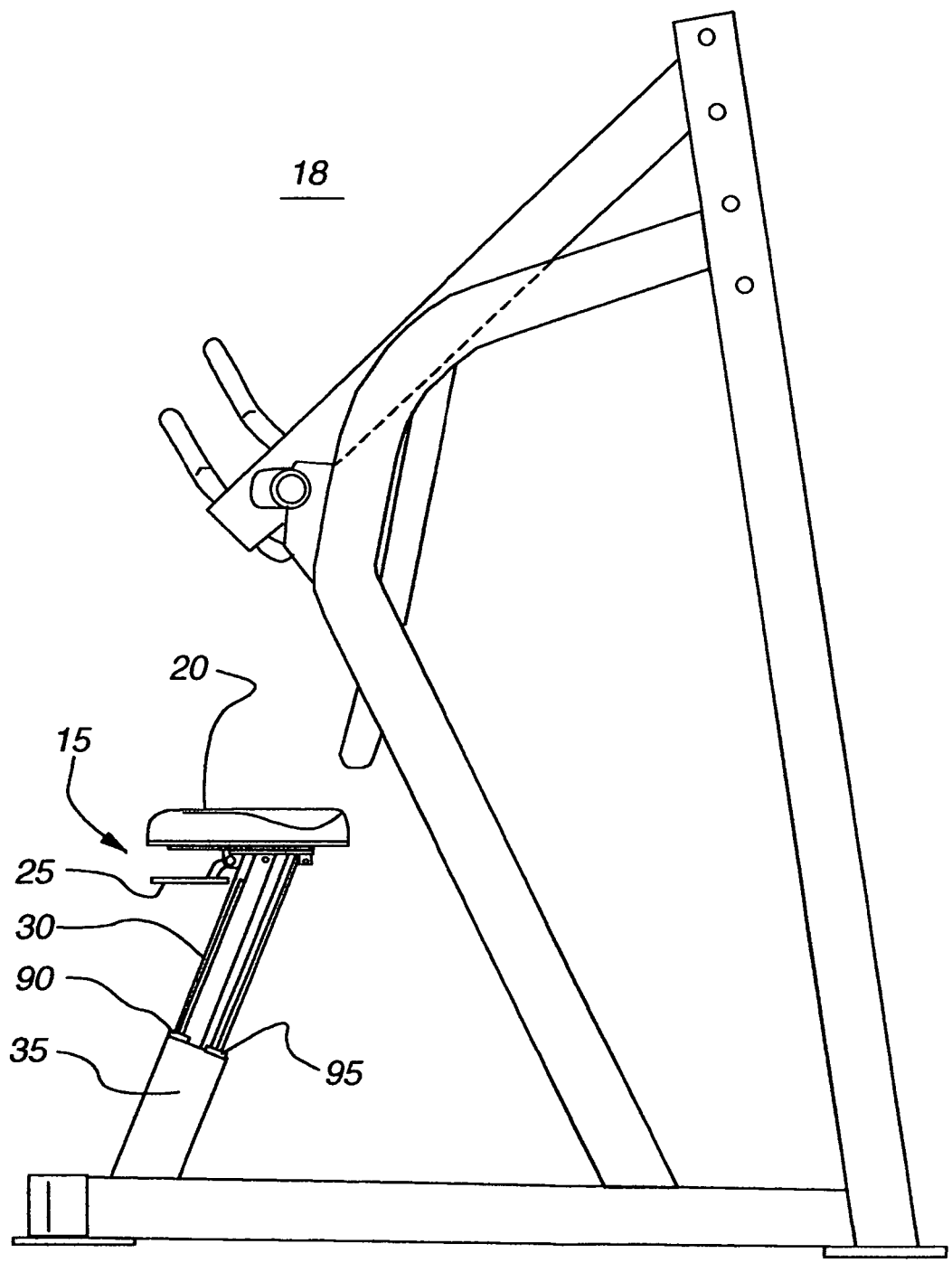
FIG. 1C is a side elevation of a piece of resistance strength training exercise equipment employing the seat height adjustment mechanism.

FIG. 1A is a side elevation of a stationary exercise bicycle 10 employing a seat height adjustment mechanism 15. FIG. 1B is a side elevation of a road or mountain type bicycle 17 employing the seat height adjustment mechanism 15. FIG. 1C is a side elevation of a piece of resistance strength training exercise equipment 18 employing the seat height adjustment mechanism 15. Examples of resistance strength training exercise equipment 18 include: supporting racks or platforms (e.g., preacher curl benches, military or shoulder press racks, etc.) for use with free weights; and resistance strength training machines that employ as resistance weight plates, deflectable members, elastic bands, springs, hydraulic cylinders, pneumatic cylinders, etc.

As will become evident from the following description, the mechanism 15 is advantageous over existing seat height adjustment mechanisms for at least the following reasons. First, the mechanism 15 offers fine seat height adjustment increments, which allows an exerciser to fine tune the seat height to his needs.

Second, in the context of the bicycles 10, 17 depicted in FIGS. 1A and 1B, the configuration of the mechanism 15 allows an exerciser to adjust the seat height while the exerciser is on, and even using, the bicycle 10, 17 and without contorting the body or assuming awkward positions to reach a seat release mounted on the frame, where such seat releases are commonly located on existing bicycles. Unlike having to dismount from the bicycle 10, 17 to adjust the seat height, as is commonly the case for existing bicycles, adjusting the seat height while the exerciser assumes a riding position while riding on or preparing to ride on the bicycle 10, 17 takes the guesswork out of achieving proper seat height.

In the context of resistance strength training exercise equipment 18, the configuration of the mechanism 15 allows an exerciser to adjust the seat height while the exerciser assumes an exercise position in the work station of the resistance equipment 18 and without contorting the body or assuming awkward positions to reach a seat release mounted on the frame, where such seat releases are commonly located on existing resistance equipment. Unlike having to vacate the workstation of the resistance equipment 18 to adjust the seat height, as is commonly the case for existing resistance equipment, adjusting the seat height while the exerciser assumes an exercise position in the workstation of the resistance equipment 18 takes the guesswork out of achieving proper seat height.

As will be described in detail later in this specification and as can be understood from FIGS. 1A-1C, to adjust the seat height upwardly while assuming an exercise position on the bicycle 10, 17 or the resistance equipment 18, the exerciser simply pulls up on the seat 20, which moves upwardly on account of the ratcheting configuration of the mechanism 15. To adjust the seat height downwardly while assuming an exercise position on the bicycle 10, 17 or the resistance equipment 18, the exerciser pulls upwardly on a mechanism actuation handle 25, which, in one embodiment, is conveniently located immediately below the front end of the seat 20. The seat 20 is then free to move downwardly until the handle 25 is released.

In other embodiments, the mechanism actuation handle 25 is located in other convenient locations near the seat 20 (e.g., near the sides or rear of the seat 20). Regardless of the exact location of the mechanism actuation handle 25, the mechanism 15 is advantageously configured to allow the mechanism actuation handle 25 to move with the seat 20, which assures that the handle 25 is always within easy reach regardless of the seat height setting. Consequently, because the mechanism actuation handle 25 moves with, and is in close proximity to, the seat 20, an exerciser can use a single hand to actuate the mechanism 15 via the handle 20 and lower the seat 20. Also, due to the location of the handle 25 and the upward ratcheting capability of the mechanism 15, an exerciser can use a single hand to upwardly displace the seat 20.

b. Single Rack Embodiment

Figure 1D:
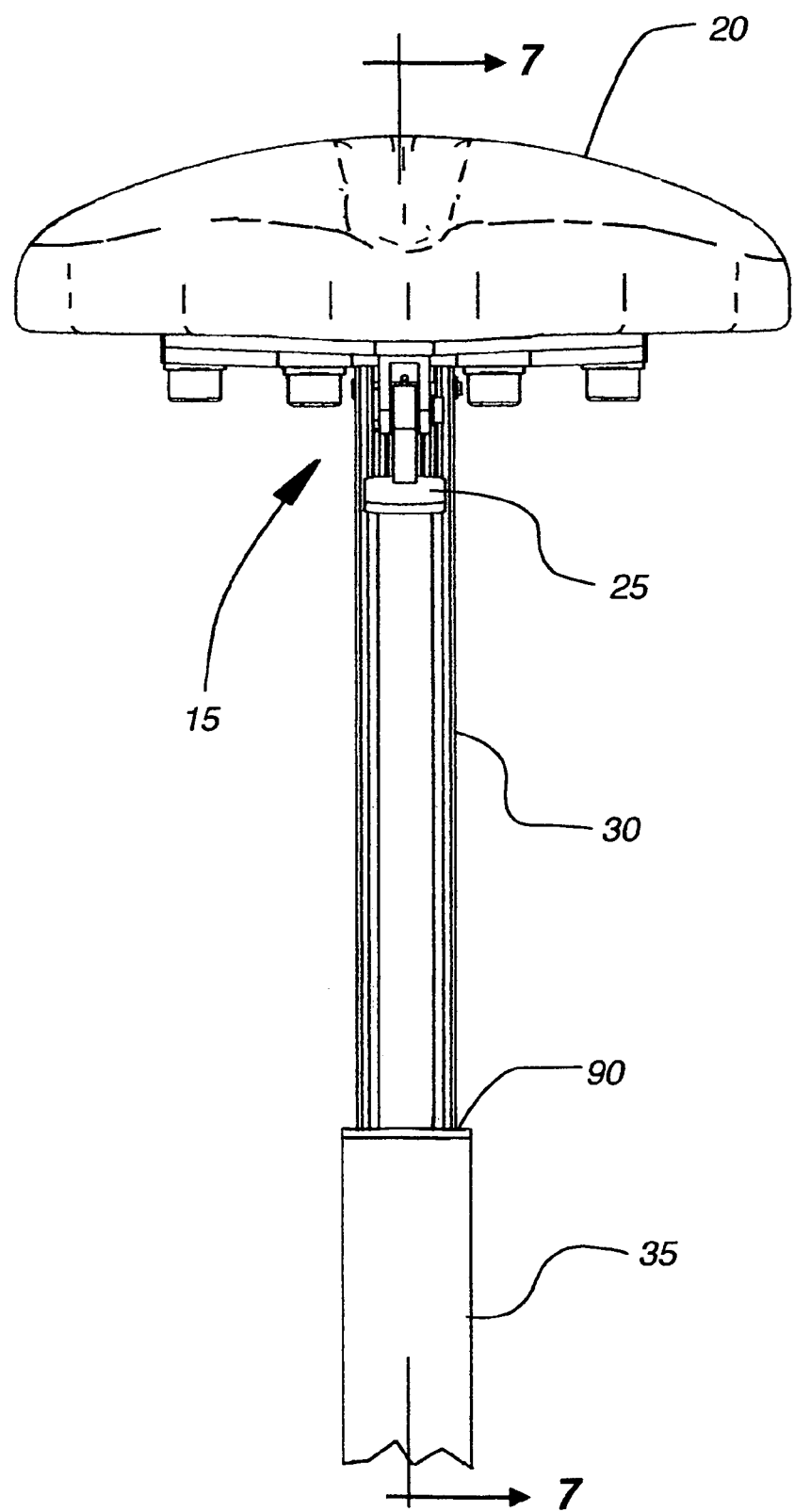
FIG. 1D is a front elevation of the seat height adjustment mechanism as viewed from the direction of view line 1D-1D in FIG. 1A.

For a discussion of a first embodiment of the seat height adjustment mechanism 15, reference is made to FIGS. 1A-1D. FIG. 1D is a front elevation of the seat height adjustment mechanism 15 as viewed from the direction of view line 1D-1D in FIG. 1A. As shown in FIGS. 1A-1D, the mechanism 15 includes a telescopic member 30 that is telescopically displaceable within a base, frame or housing member 35 extending generally upwardly from the frame of the exercise equipment (bicycle 10, 17 or resistance equipment 18). The seat 20 is coupled to an upper end of the telescopic member 30, and the lower end of the telescopic member 30 is telescopically received within the base member 35.

Figure 2:
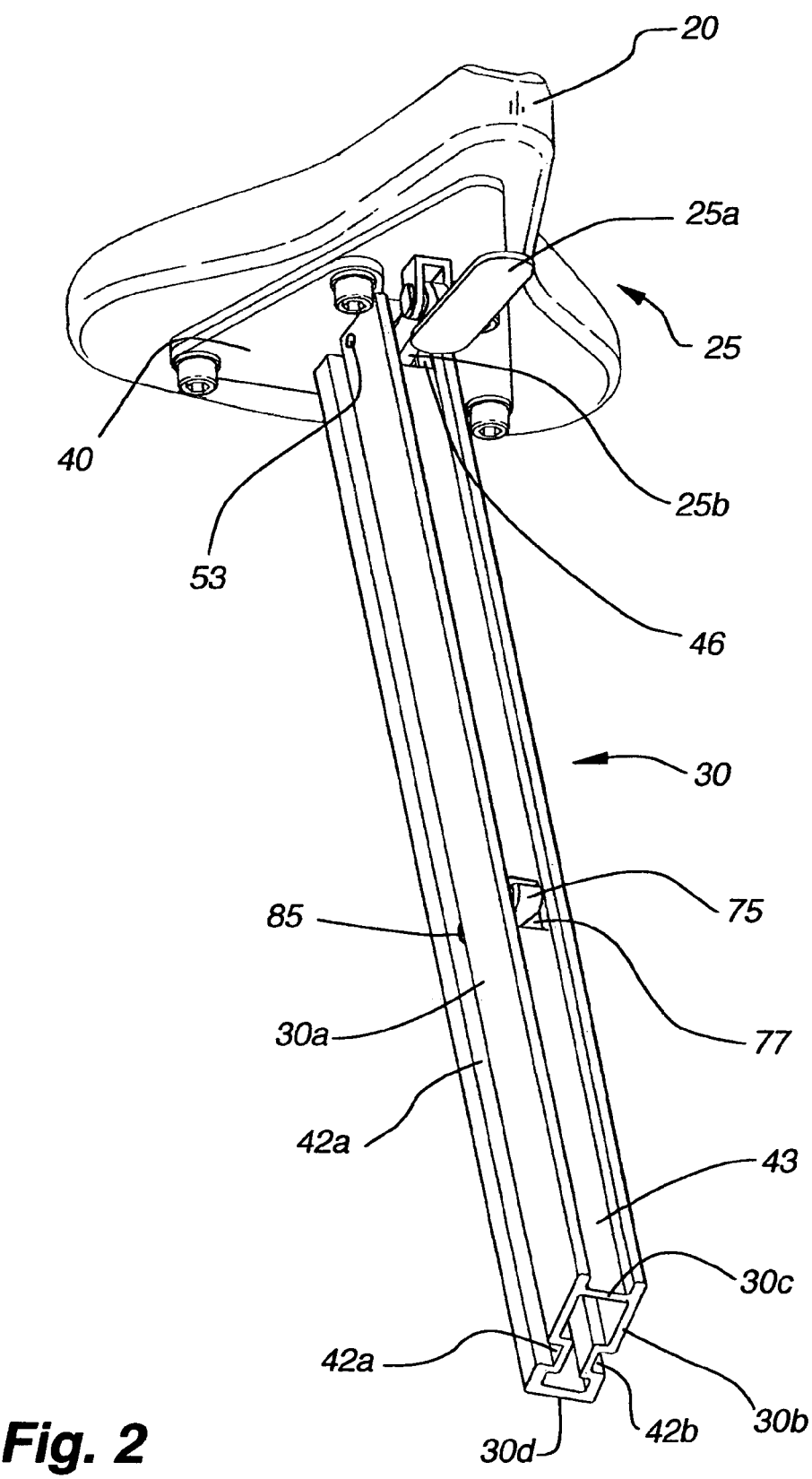
FIG. 2 is a bottom isometric view of the telescopic member and seat.
Figure 3:
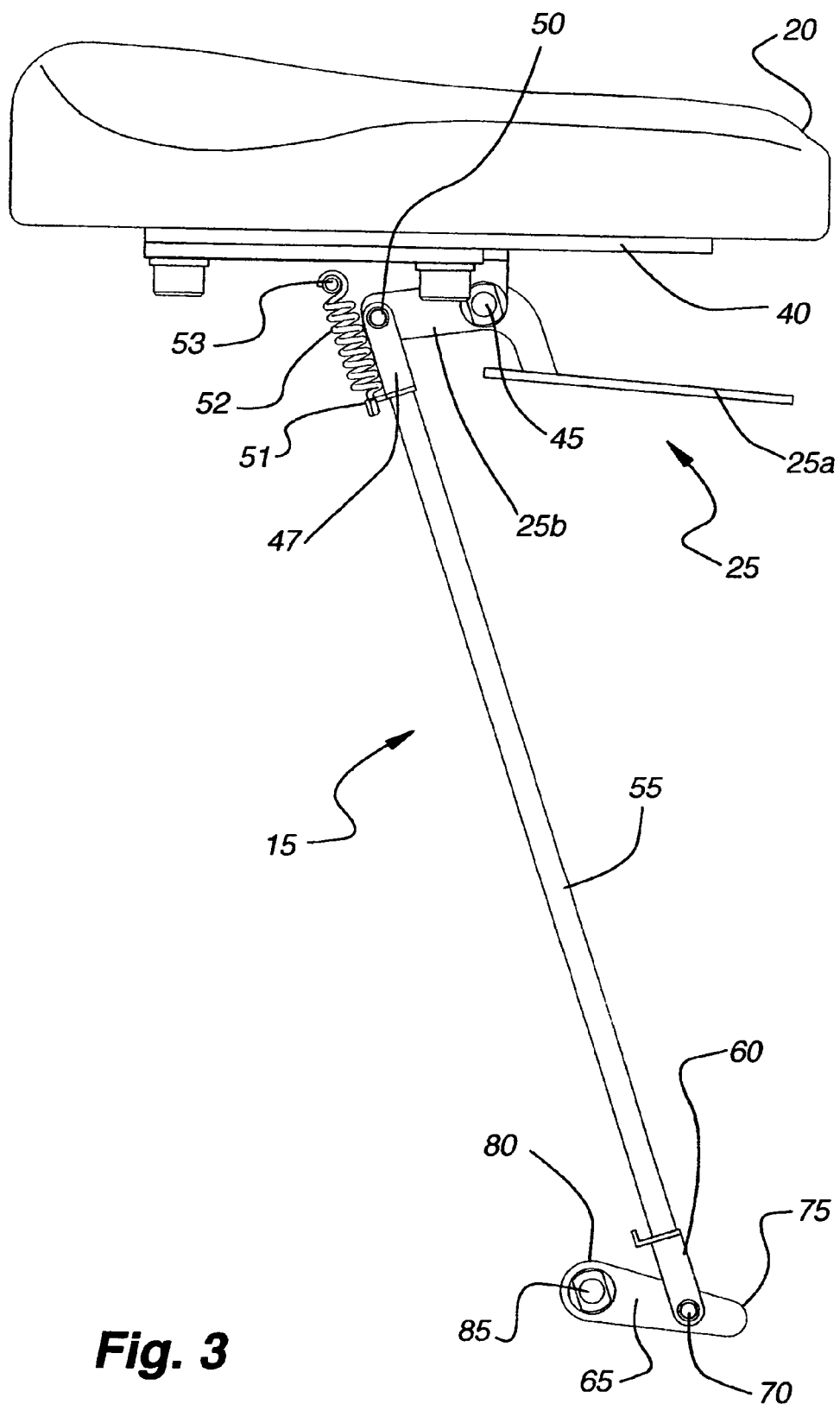
FIG. 3 is a side elevation view of the components of the mechanism that are hidden within the telescopic member.
Figure 4:
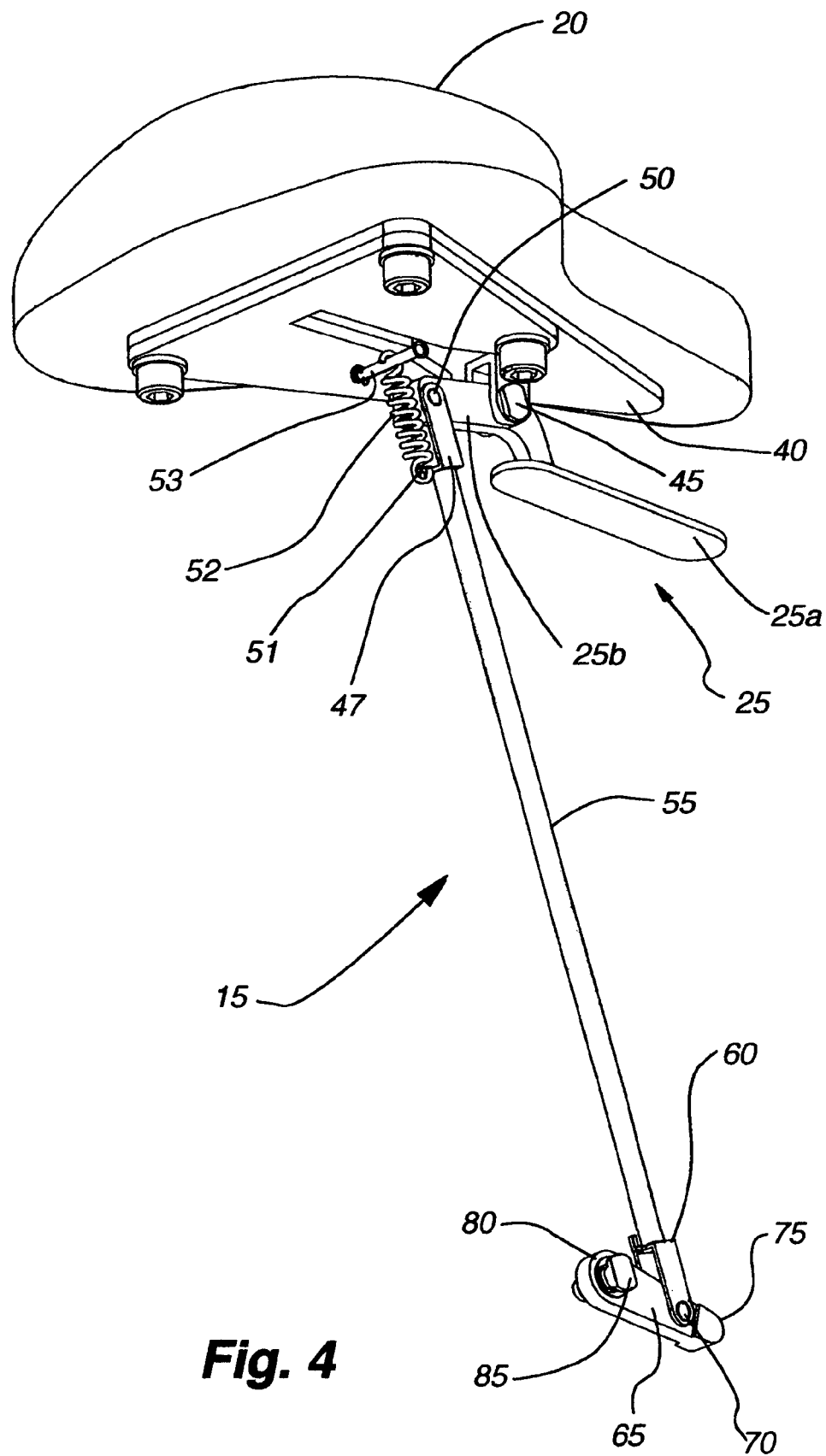
FIG. 4 is a rear isometric of the same components illustrated in FIG. 3.
Figure 12:
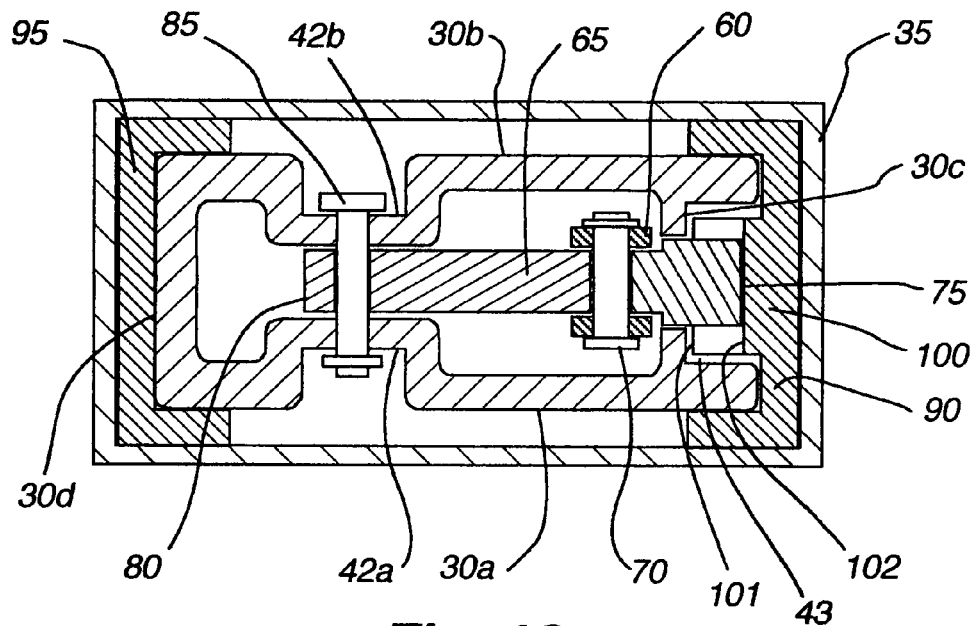
FIG. 12 is a cross-section, as taken along section line 12-12 in FIG. 7, of the telescopic and hose members at the engagement member.
Figure 11:
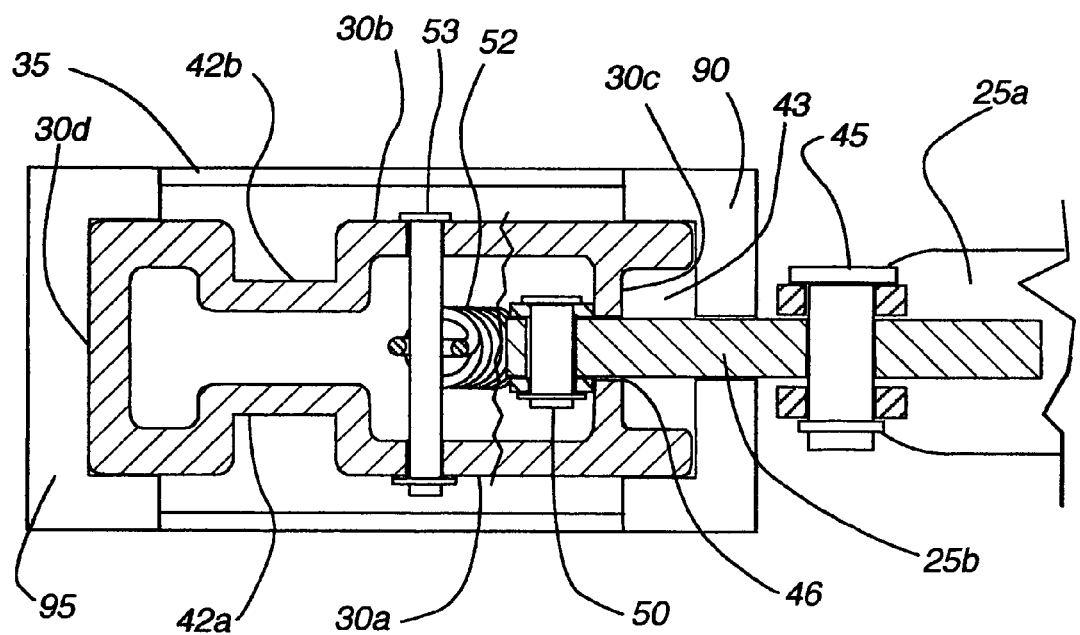
FIG. 11 is a cross-section, as taken along section line 11-11 in FIG. 7, of the telescopic member at the mechanism activation handle.
Figure 13:
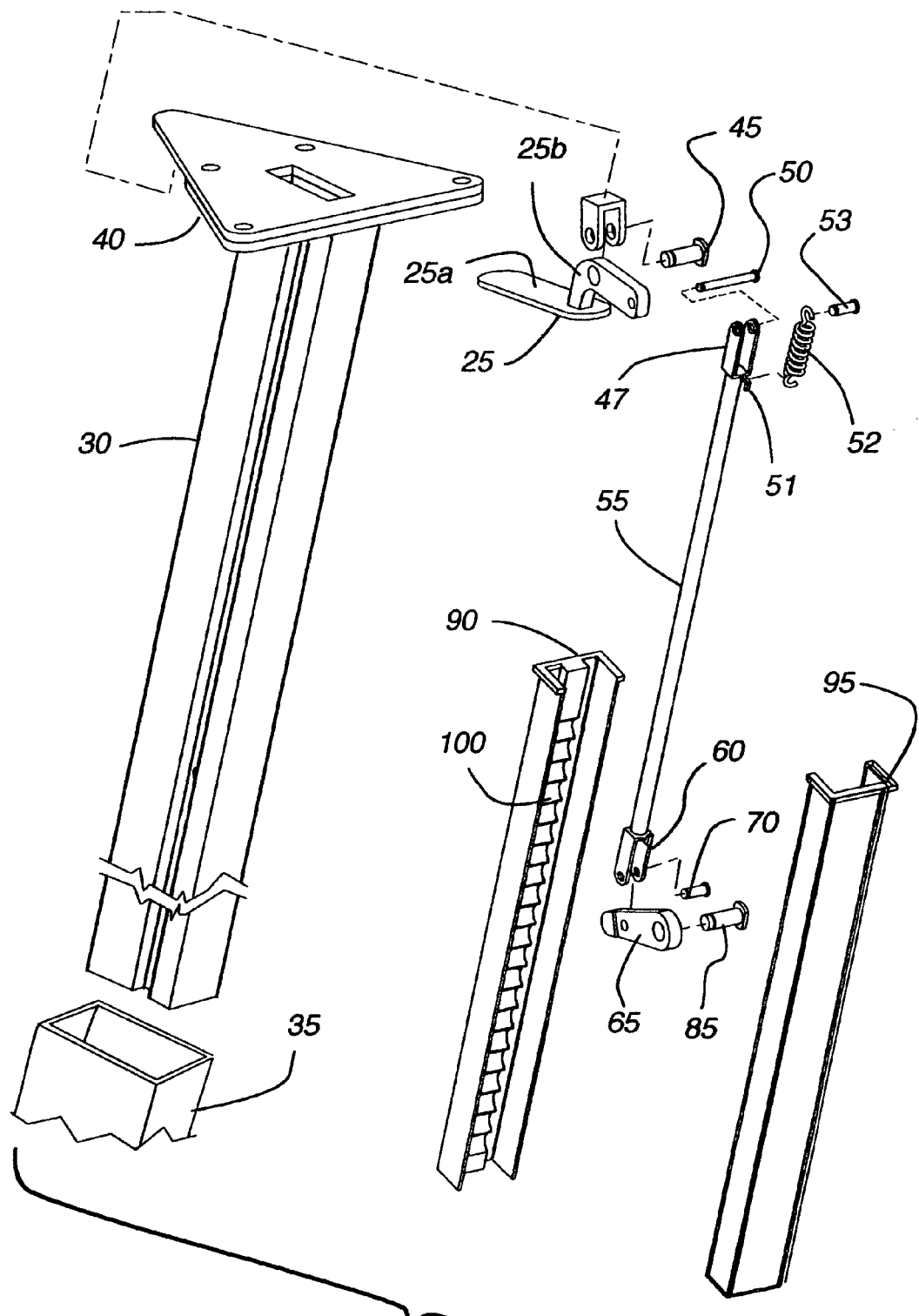
FIG. 13 is an exploded isometric view of the seat height adjustment mechanism.

For a discussion of the telescopic member 30 and the components of the mechanism 15 supported thereby, reference is made to FIGS. 2-4 and 11-13. FIG. 2 is a bottom isometric view of the telescopic member 30 and seat 20. FIG. 3 is a side elevation view of the components of the mechanism 15 that are hidden within the telescopic member 30. FIG. 4 is a rear isometric of the same components illustrated in FIG. 3. FIG. 11 is a cross-section, as taken along section line 11-11 in FIG. 7, of the telescopic member 30 at the mechanism actuation handle 25. FIG. 12 is a cross-section, as taken along section line 12-12 in FIG. 7, of the telescopic and base members 30, 35 at the engagement member 65. FIG. 13 is an exploded isometric view of the seat height adjustment mechanism 15.

As indicated in FIG. 2, the upper end of the telescopic member 30 is coupled to a seat support plate 40, which is coupled to, and supports, the seat 20. As can be understood from FIGS. 1A-1D, the lower end of the telescopic member 30 is telescopically received in the frame member 35. The telescopic member 30 includes opposed lateral sidewalls 30a, 30b and front and rear sidewalls 30c, 30d. In one embodiment, each lateral sidewall 30a, 30b includes a longitudinally extending trough or groove 42a, 42b that, in one embodiment, extends the length of the telescopic member 30 to stiffen the telescopic member 30. In other embodiments, each groove 42a, 42b will extend along a lesser extent of the telescopic member 30. For example, in one embodiment, each groove 42a, 42b will be a short segment that is only sufficiently long to receive the pivot pin 85 of the engagement member 65 discussed later in this specification. In one embodiment, a front longitudinally extending trough or groove 43 is defined by the front sidewall 30c and extends the length of the front sidewall 30c.

As shown in FIGS. 3, 4, 11 and 13, the mechanism actuation handle 25 is pivotally coupled to the seat support plate 40 via a pivot pin 45 and includes a forward portion 25a forward of the pivot pin 45 and a rearward portion 25b rearward of the pivot pin 45. As illustrated in FIGS. 2 and 11, the actuation handle 25 extends through an opening 46 in the groove 43 near the seat plate 40. The actuation handle 25 is pivotal within the opening 46 about the pivot pin 45.

As indicated in FIGS. 3 and 4, the forward portion 25a of the mechanism actuation handle 25 is adapted to be engaged by an exerciser's hand to adjust seat height. In one embodiment, the forward portion 25a is conveniently positioned just below the front tip of the seat 20 to allow an exerciser to simply reach down to immediately below the seat 20 to adjust the seat height without dismounting from the seat 20 of the exercise equipment (e.g., bicycle 10, 17 or resistance equipment 18), contorting the body or assuming an awkward position.

In other embodiments, the forward or hand engagement portion 25a of the handle 25 is located in other convenient locations near the seat 20 (e.g., in or near the sides or rear of the seat 20). Regardless of the exact location of the mechanism actuation handle 25, the mechanism actuation handle 25 moves with, and is in close proximity to, the seat 20. As a result, an exerciser can use a single hand to actuate the mechanism 15 via the handle 25 and lower the seat 20.

As depicted in FIGS. 3, 4, 11 and 13, the rear end of the rear portion 25b is pivotally coupled to a top clevis 47 via a pivot pin 50. The top clevis 47 includes a rearwardly extending ledge 51 that receives a bottom end of a spring 52. The top end of the spring 52 receives a pin 53, which, as indicated in FIGS. 2 and 11, is received in pinholes in the opposed lateral sidewalls 30a, 30b of the telescopic member 30.

As shown in FIGS. 3, 4, 12 and 13, the top clevis 47 is coupled to a top end of a longitudinally extending linkage member 55, which has a bottom end that is coupled to a bottom clevis 60. The bottom clevis 60 is pivotally coupled to an engagement member 65 via a pivot pin 70. The forward end 75 of the engagement member 50 forms an engagement end 75 for engaging the teeth of a rack, as described later in this specification. The rearward end 80 of the engagement member 65 pivotally receives a pivot pin 85, which is received in the opposed lateral grooves 42a, 42b of the telescopic member 30, as can be understood from FIGS. 2, 12 and 13.

As indicated in FIG. 2 and as can be understood from FIGS. 3, 4, and 12 depending on how the engagement member 65 is pivotally oriented around the pivot pin 85, the engagement end 75 protrudes to a greater or lesser extent from an opening 77 in the front groove 43 of the telescopic member 30. As illustrated in FIG. 2, in one embodiment the opening 77 exists in the groove 43 as a relatively short slot 77 that is only marginally larger than the engagement end 75. In other embodiments, the opening 77 will be a substantially longer slot 77 that will extend to a greater or lesser extent along the length of the groove 43. In one such embodiment, the slot 77 will have a length that is generally coextensive with the rack 100.

Figure 5:
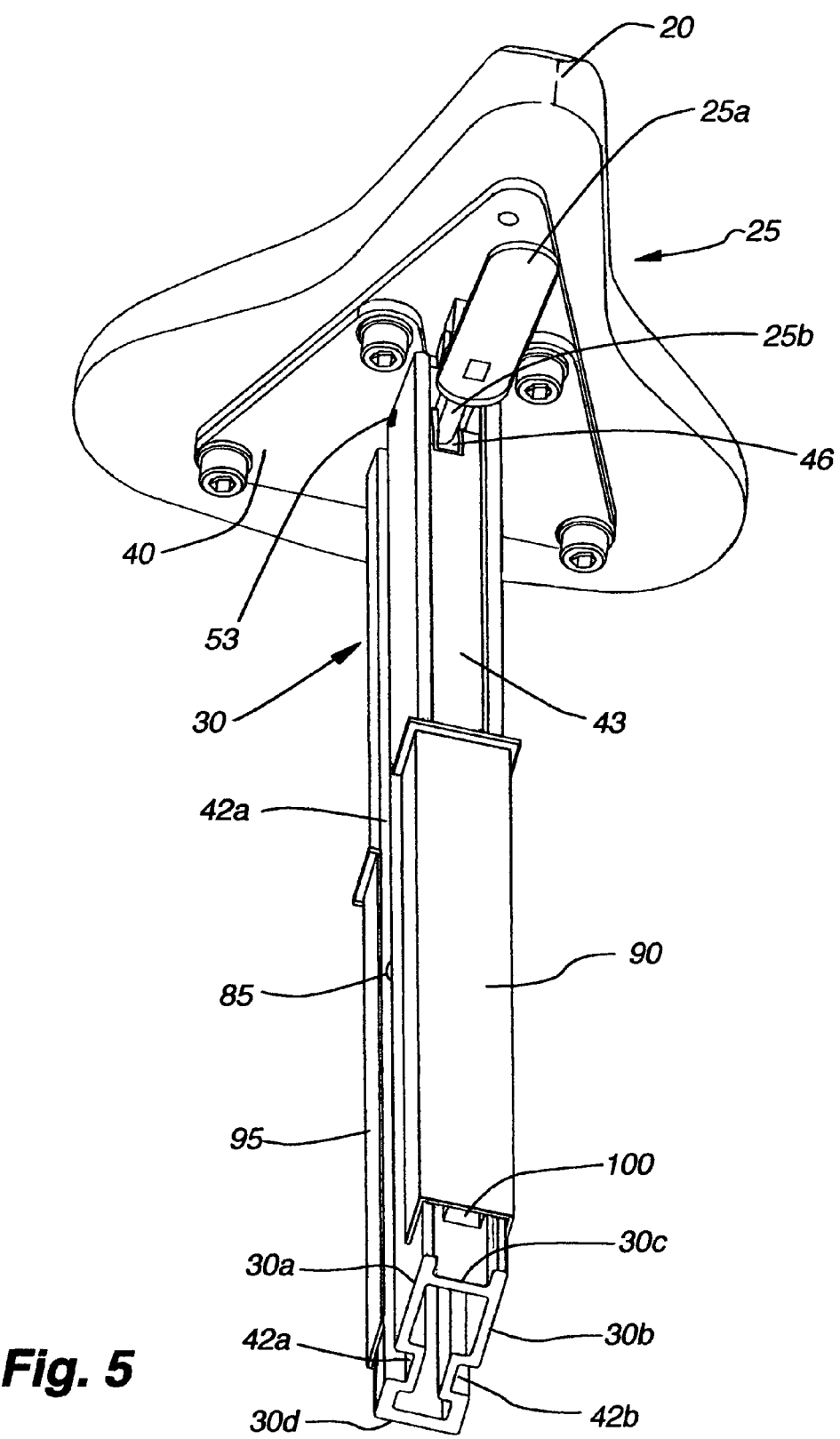
FIG. 5 is an isometric view similar to the one depicted in FIG. 2, except illustrating the mating of the sleeve portions of the housing member with the features of the telescopic member.
Figure 6:
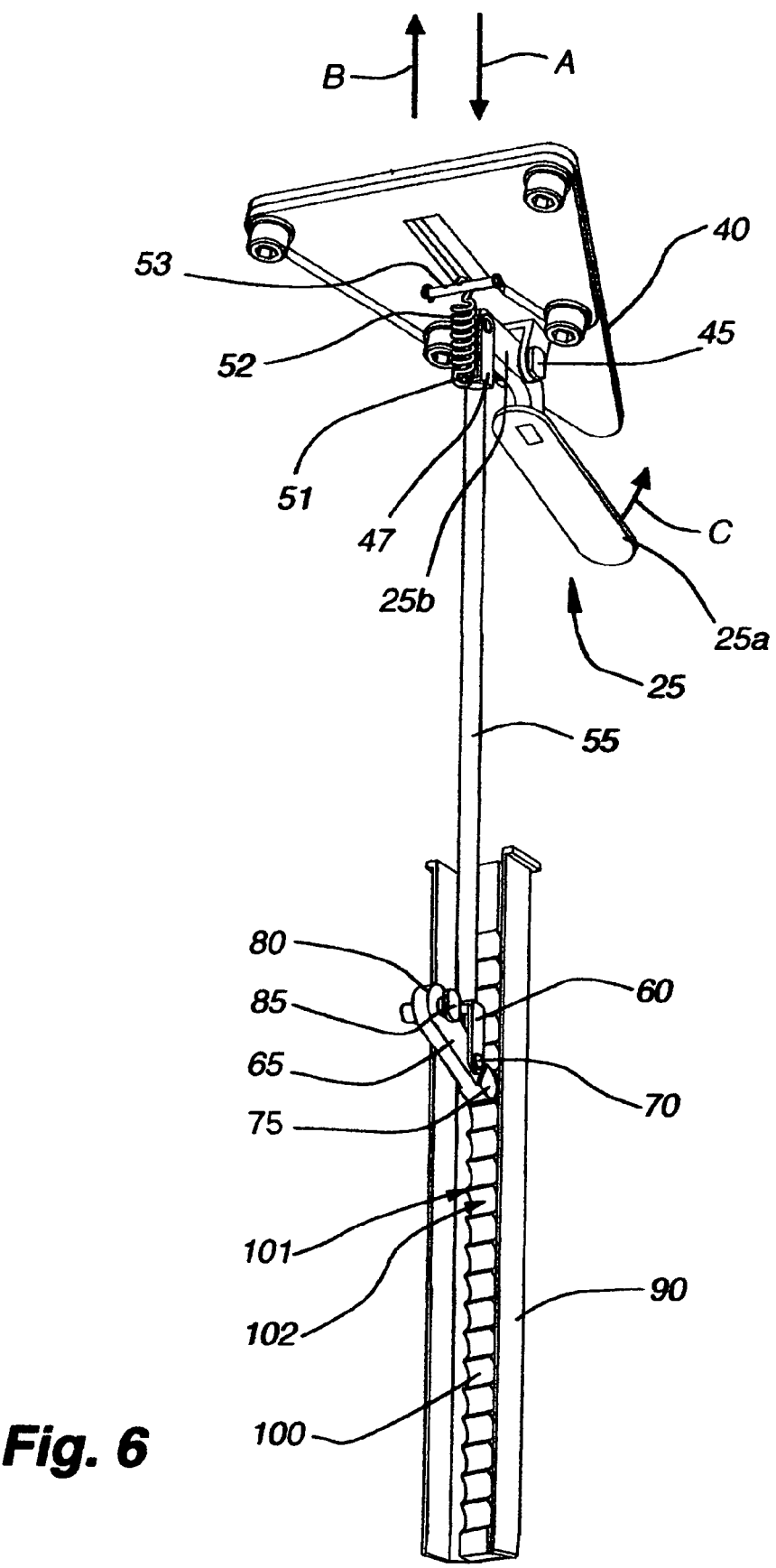
FIG. 6 is an isometric view illustrating the relationship between the mechanism components of the telescopic member and the rack of the forward sleeve portion of the housing member, wherein the engagement member is engaged with the rack.
Figure 7:
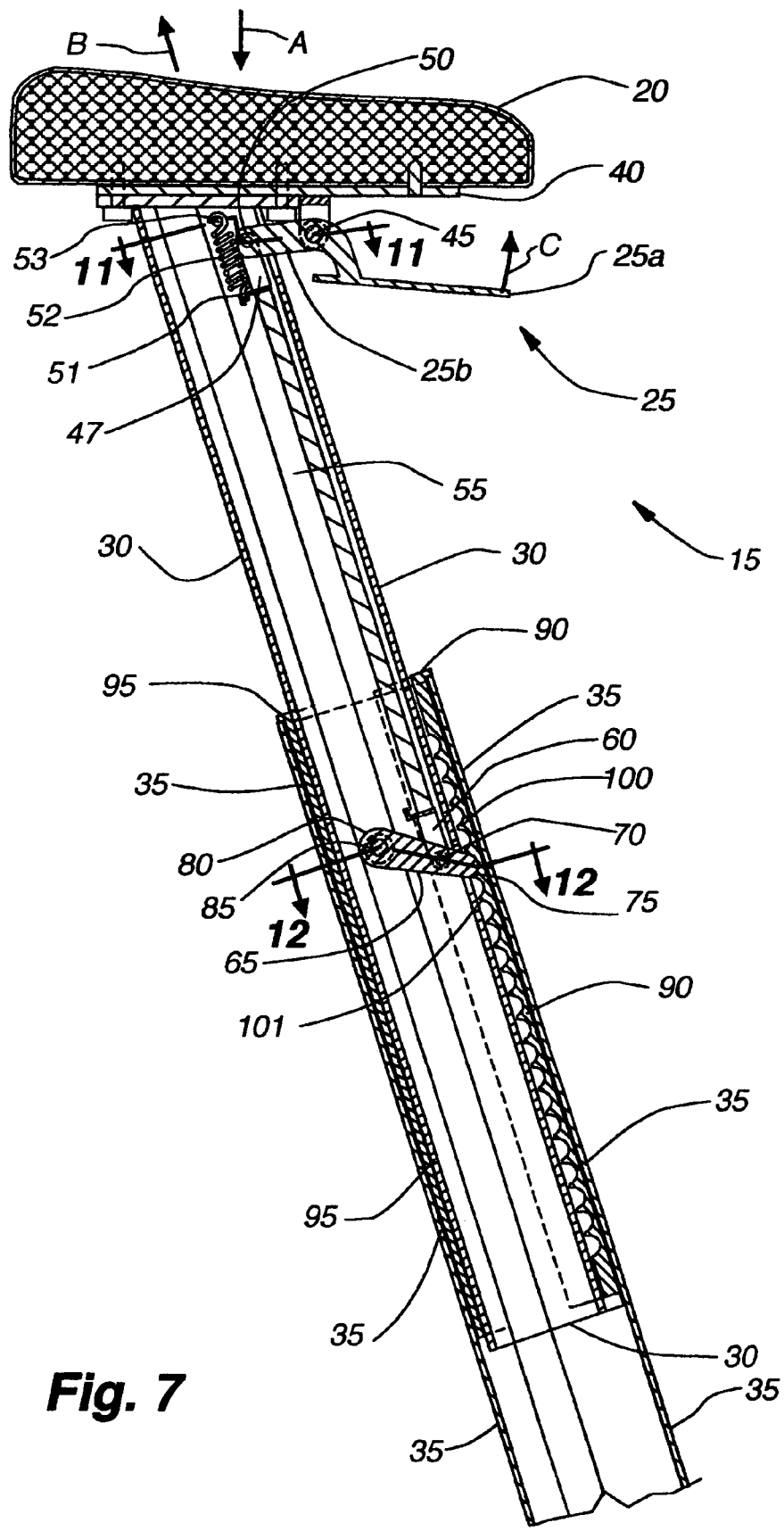
FIG. 7 is a longitudinal sectional side elevation, as taken along section line 7-7 of FIG. 1D, of the seat, telescopic member, housing member and the components contained therein, wherein the engagement member is engaged with the rack.
Figure 8:
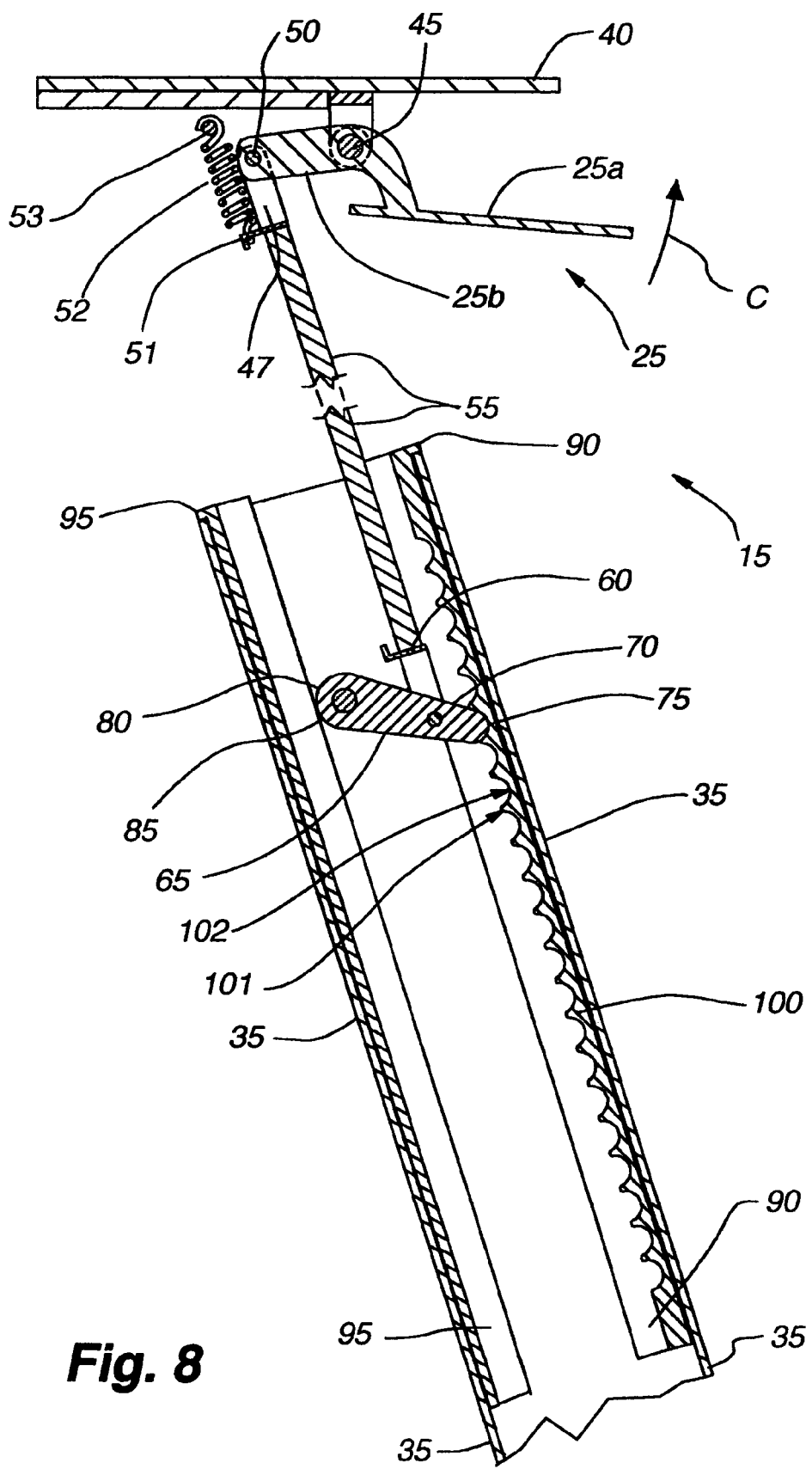
FIG. 8 is the same sectional view depicted in FIG. 7, except the telescopic member and seat are hidden for clarity purposes.
Figure 9:
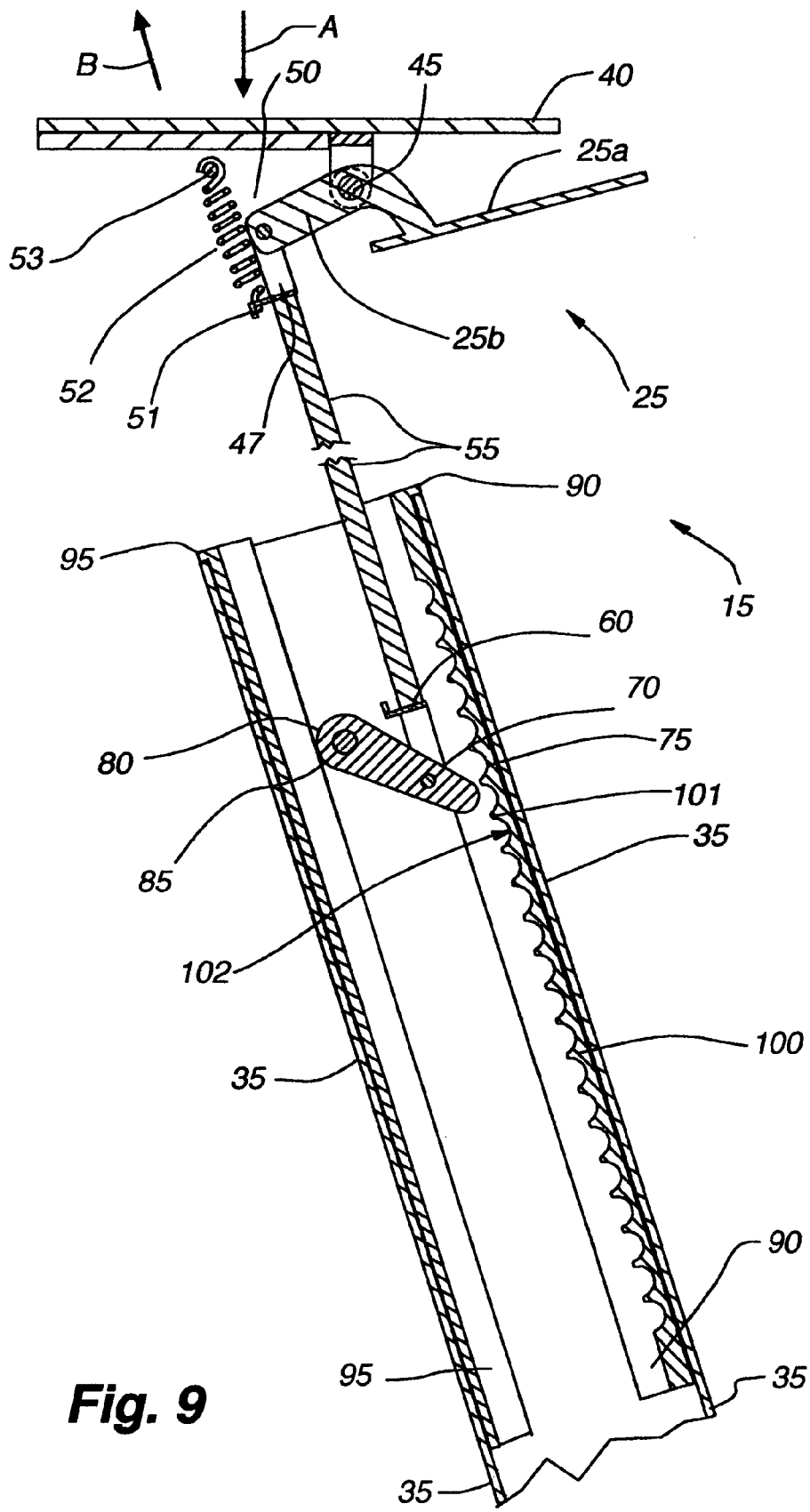
FIG. 9 is the same sectional view depicted in FIG. 8, except the engagement member is disengaged from the rack.
Figure 10:
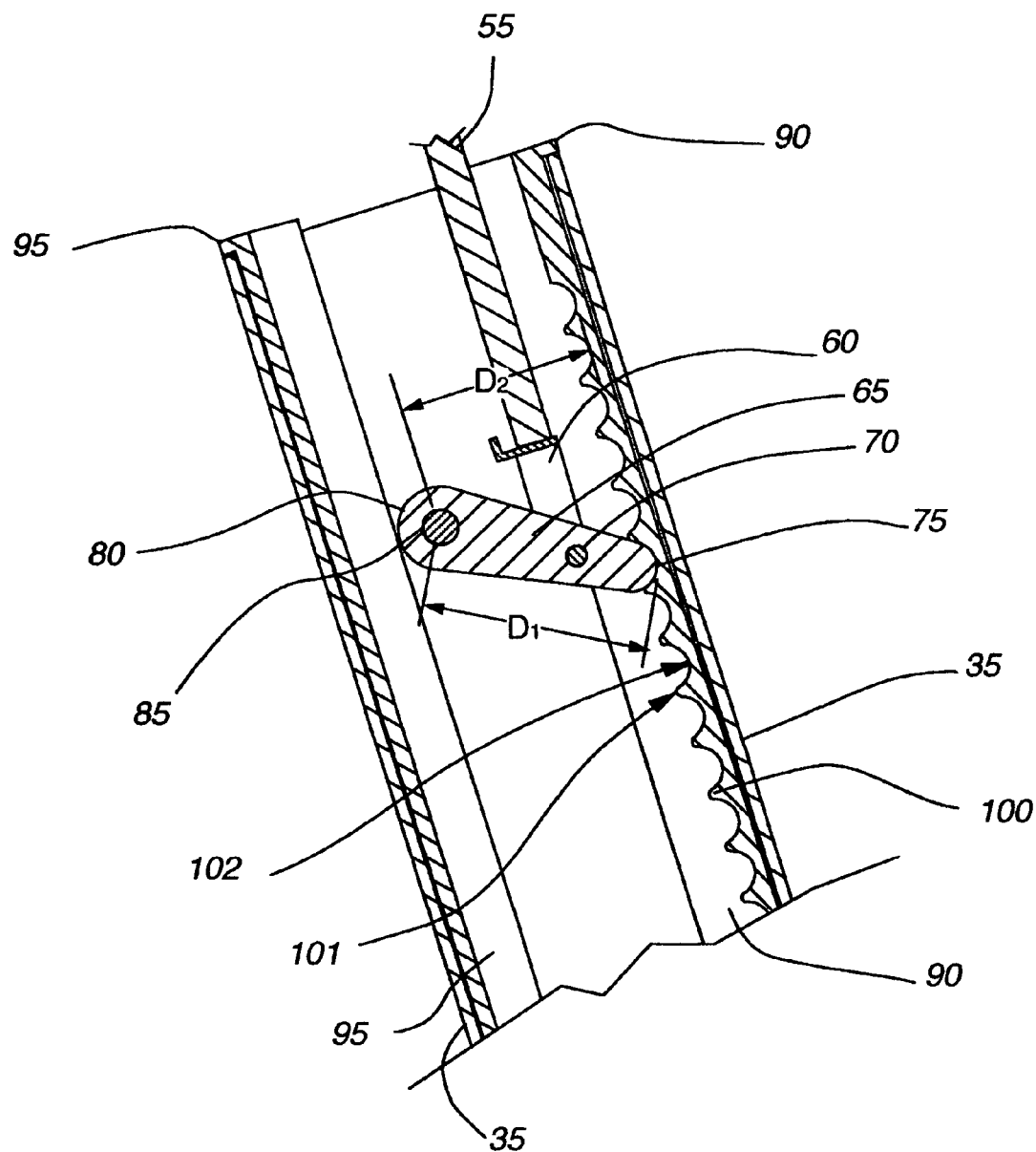
FIG. 10 is an enlarged view of the engagement member engaging the rack, as depicted in FIG. 8.

For a discussion of the components of the housing member 35 and the interaction between the components of the telescopic and housing members 30, 35, reference is made to FIGS. 5-13. FIG. 5 is an isometric view similar to the one depicted in FIG. 2, except illustrating the mating of the sleeve portions 90, 95 of the housing member 35 with the features of the telescopic member 30. FIG. 6 is an isometric view illustrating the relationship between the mechanism 15 components of the telescopic member 30 and the rack 100 of the forward sleeve portion 90 of the housing member 35, wherein the engagement member 65 is engaged with the rack 100. FIG. 7 is a longitudinal sectional side elevation, as taken along section line 7-7 of FIG. 1D, of the seat 20, telescopic member 30, housing member 35 and the components contained therein, wherein the engagement member 65 is engaged with the rack 100. FIG. 8 is the same sectional view depicted in FIG. 7, except the telescopic member 30 and seat 20 are hidden for clarity purposes. FIG. 9 is the same sectional view depicted in FIG. 8, except the engagement member 65 is disengaged from the rack 100. FIG. 10 is an enlarged view of the engagement member 65 engaging the rack 100, as depicted in FIG. 8.

As best understood from FIGS. 1A-1C, 5, 8, 12 and 13, the housing base or frame member 35 includes forward and rearward sleeves 90, 95 that are located between the inner surfaces of the frame member 35 and the outer surfaces of the telescopic member 30. As shown in FIGS. 5 and 12, in one embodiment, when the telescopic member 30 is received in the housing member 35, the rearward sleeve 95 receives the rear sidewall 30d and the rear portions of the opposed sidewalls 30a, 30b. Similarly, when the telescopic member 30 is received in the housing member 35, the rack 100, which protrudes inwardly from and extends longitudinally along the inner surface of the forward sleeve 90 (see FIGS. 6 and 12), is received in the forward groove 43 of the telescopic member 30 as the forward sleeve 90 receives the forward sidewall 30c and the forward portions of the lateral sidewalls 30a, 30b.

As can be understood from FIGS. 6-10, in one embodiment, the engagement end 75 is oriented towards the rack 100 in a downward direction. As indicated in FIGS. 7, 8 and 10, the spring 52 biases the linkage member 55 upwardly, which tends to lift the engagement end 75 of the engagement member 65 into engagement with the teeth 101 of the rack 100. The biasing force of the spring 52 is adequate to engage the engagement member 65 with the teeth 101 of the rack 100 to prevent downward displacement of the telescopic member 30 in the housing member 35. The downward force (as indicated by arrow A) exerted on the telescopic member 30 by the weight of the seat 20, not to mention the weight of the exerciser seated on the seat 20, increases the magnitude of the engagement between the engagement end 75 of the engagement member 65 and the teeth 101 of the gear rack 100.

As best understood from FIG. 10, the engagement member 65 is placed into a bind against the rack 100 via the biasing force of the spring 52 and any downward force exerted on the linkage member 55 (e.g., the weight of the seat 20 and the exerciser seated on the seat 20) because of the downward orientation of the engagement end 75 and because the distance $D_1$ between the engagement end 75 and the pivot pin 85 is greater than the distance $D_2$ between the pivot pin 85 and the gear rack 100. The bind prevents the engagement member 65 from pivoting any further counterclockwise about the pivot pin 85, as viewed in FIG. 10, once the engagement end 75 of the engagement member 65 has engaged the teeth 101 of the rack 100. As a result, the linkage member 55 and the attached telescopic member 30 are prevented from displacing downwardly into the housing member 35. Thus, the seat 20 cannot be lowered without disengaging the engagement feature 65 from the rack 100 via actuation of the handle 25, as described below.

As can be understood from FIGS. 6-8 and 10, because the engagement end 75 is oriented in a downward direction, the telescopic member 30 and seat 20 can be raised by simply exerting an upward force (as indicated by arrow B) on the seat 20 or telescopic member 30; actuating the handle 25 to disengage the engagement feature 65 from the rack 100 is not required to move the seat 20 upwardly. Exerting the upward force (arrow B) on the seat 20 or telescopic member 30 causes the engagement member to displace upwardly along the rack 100 in a ratchet like manner. Specifically, as the engagement member 65 moves upwardly along the rack 100, the engagement end 75, because of its downward orientation, is able to pivot downwardly about the pivot pin 85 to clear each encountered rack tooth 101. Since the engagement end 75 is biased upwardly by the spring 52, as the engagement end 75 clears a tooth 101, the engagement end 75 pivots upwardly to nestle into the space 102 between tooth tips 101 prior to riding up the slope of the next tooth 101. Thus, the seat 20 is free to ratchet upwardly via the configuration of the mechanism 15, without having to disengage the engagement member 65 from the rack 100 via the actuation handle 25. In other words, due to the configuration of the mechanism 15, it is not necessary to use the handle 25 to cause the engagement member 65 to break contact with the rack 100 to allow the seat 20 to be displaced upwardly.

As can be understood form FIGS. 6-10, to lower the seat 20, the exerciser unweights the seat 20 to relieve the bind between the engagement member 65 and rack 100 and pulls the forward portion 25a of the actuation handle 25 upwardly, as indicated by arrow C. The upward force, as indicated by arrow C, causes the actuation handle 25 to pivot counter-clockwise (as viewed in FIGS. 7, 8 and 10) against the biasing force of the spring 52 to become positioned as indicated in FIG. 9. The counterclockwise rotation of the handle 25 forces the linkage member 55 downwardly, which causes the engagement member 65 to pivot downwardly (i.e., clockwise as viewed in FIGS. 7, 8 and 10) about the pivot pin 85 to become positioned as depicted in FIG. 9. As a result, the engagement end 75 of the engagement member 65 is caused to disengage from the teeth 101 of the rack 100 (see FIG. 9) as the telescopic member 30 is lowered into the housing, base or frame member 35. In one embodiment, the disengagement caused by operating the handle 25 is such that the engagement end 75 breaks contact with the rack 100.

When the exerciser has positioned the seat 20 at the appropriate height, the actuation handle 25 is released, thereby allowing the spring 52 to bias the engagement member 65 back into binding engagement with the rack 100, as positioned in FIGS. 7, 8 and 10, to prevent further downward displacement of the seat 20. As previously mentioned, due to the mechanism actuation handle 25 moving with and being in close proximity to the seat 20, an exerciser can use a single hand to actuate the mechanism 15 via the handle 20 and lower the seat 20.

The preceding discussion has been concerned with an embodiment wherein the rack 100 is located on the front side wall 30c, the engagement member 65 is oriented to engage the rack 100 in such a location, the rack 100 has gear-like teeth 101 with rounded grooves and relatively small teeth, and the engagement member 65 is adapted to engage such gear-like teeth 101. However, in other embodiments, the rack 100 is located on the rear or lateral sidewalls 30d, 30a, 30b and the engagement member 65 is oriented to engage the rack 100 where so located. In one embodiment, the gear rack 100 is equipped with cog-like teeth 101 and the engagement member 65 is adapted to engage such cog-like teeth 101. In other embodiments, the teeth 101 will have other teeth and groove profiles. In one embodiment, the rack 100 and its teeth 101 are formed of mild steel. In other embodiments, the rack 100 and teeth 101 are formed of other types of steel, aluminum, polymers, composites, or etc.

In one embodiment, the rack 100 does not have teeth 101, but is instead a generally planar resilient polymer strip or a polymer strip with a high coefficient of friction. In such an embodiment, the engagement member 65 is a cam adapted to wedge/cam against the polymer strip 100 to prevent the cam-like engagement member 65 from displacing relative to the polymer strip 100, thereby preventing the telescopic member 30 from displacing into the housing, frame or base member 30. In other embodiments, the rack 100 will be any other type of surface 100 and of any other type of material, and the engagement member 65 will be configured to engage against such a surface 100 to prevent downward displacement of the seat 20.

c. Double Rack Embodiment

For a discussion of another embodiment of the seat height adjustment mechanism 15, reference is made to FIGS. 14-18.

Figure 14:
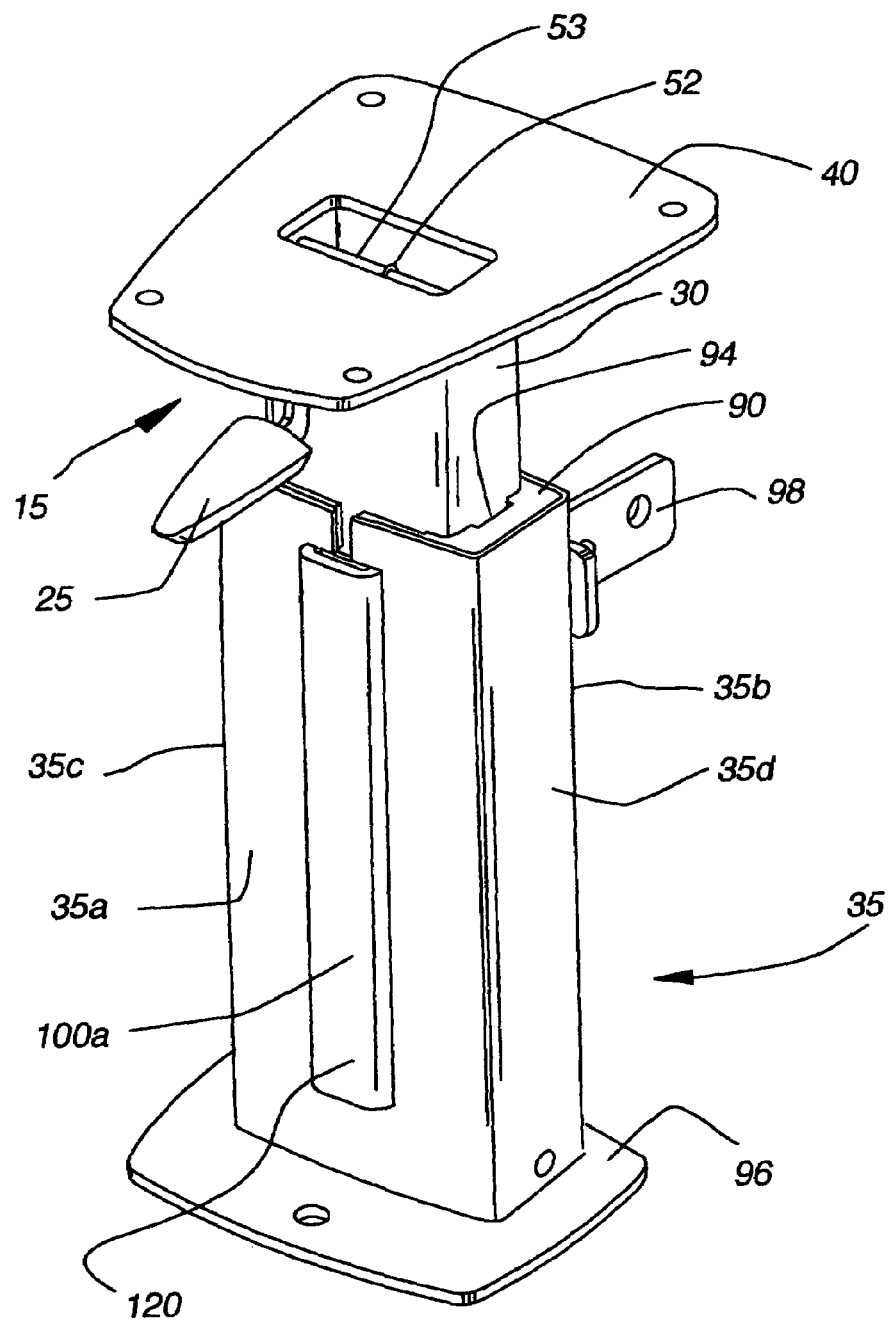
FIG. 14 is a top-front isometric view of the seat height adjustment mechanism.
Figure 15:
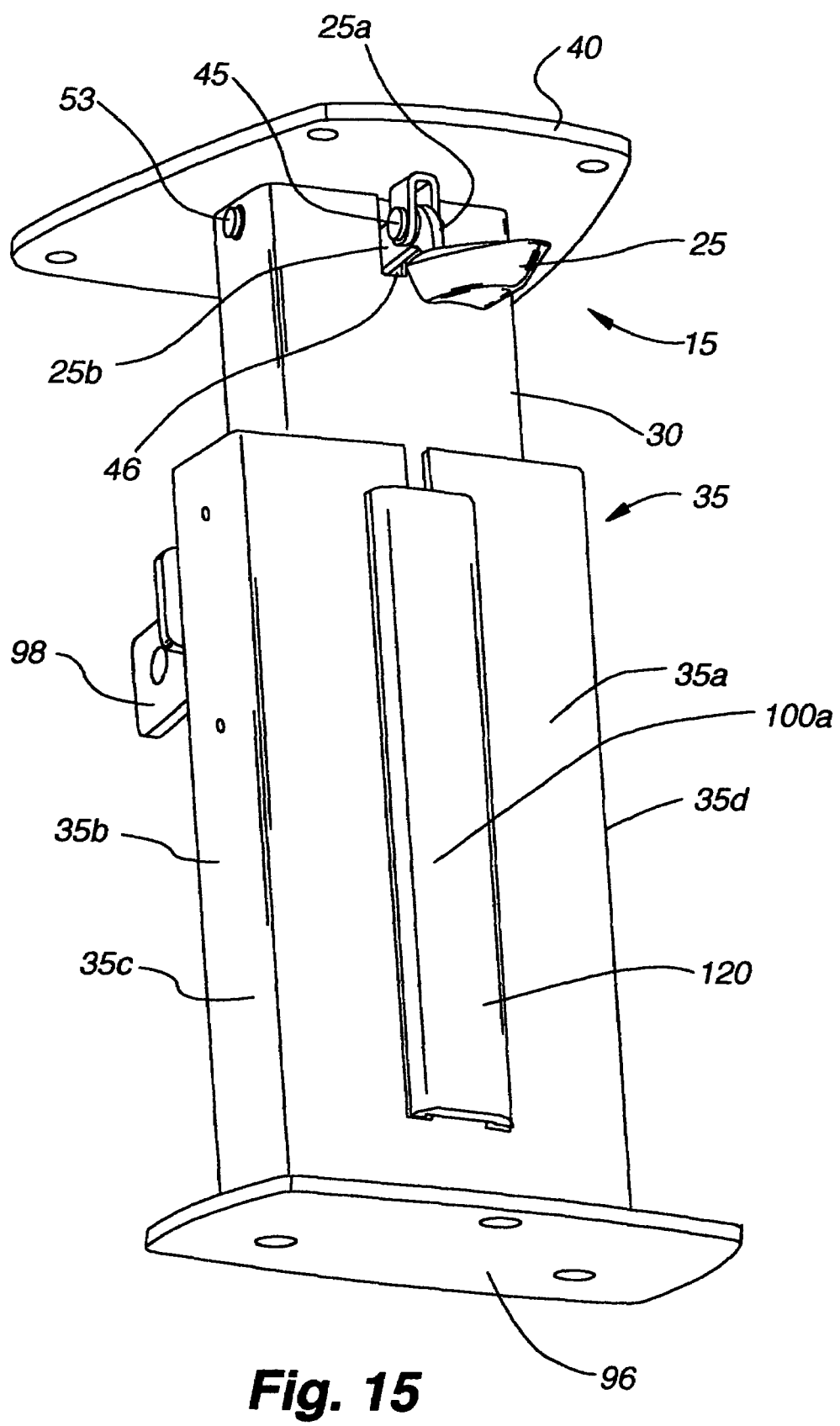
FIG. 15 is a bottom-front isometric view of the mechanism.
Figure 16:
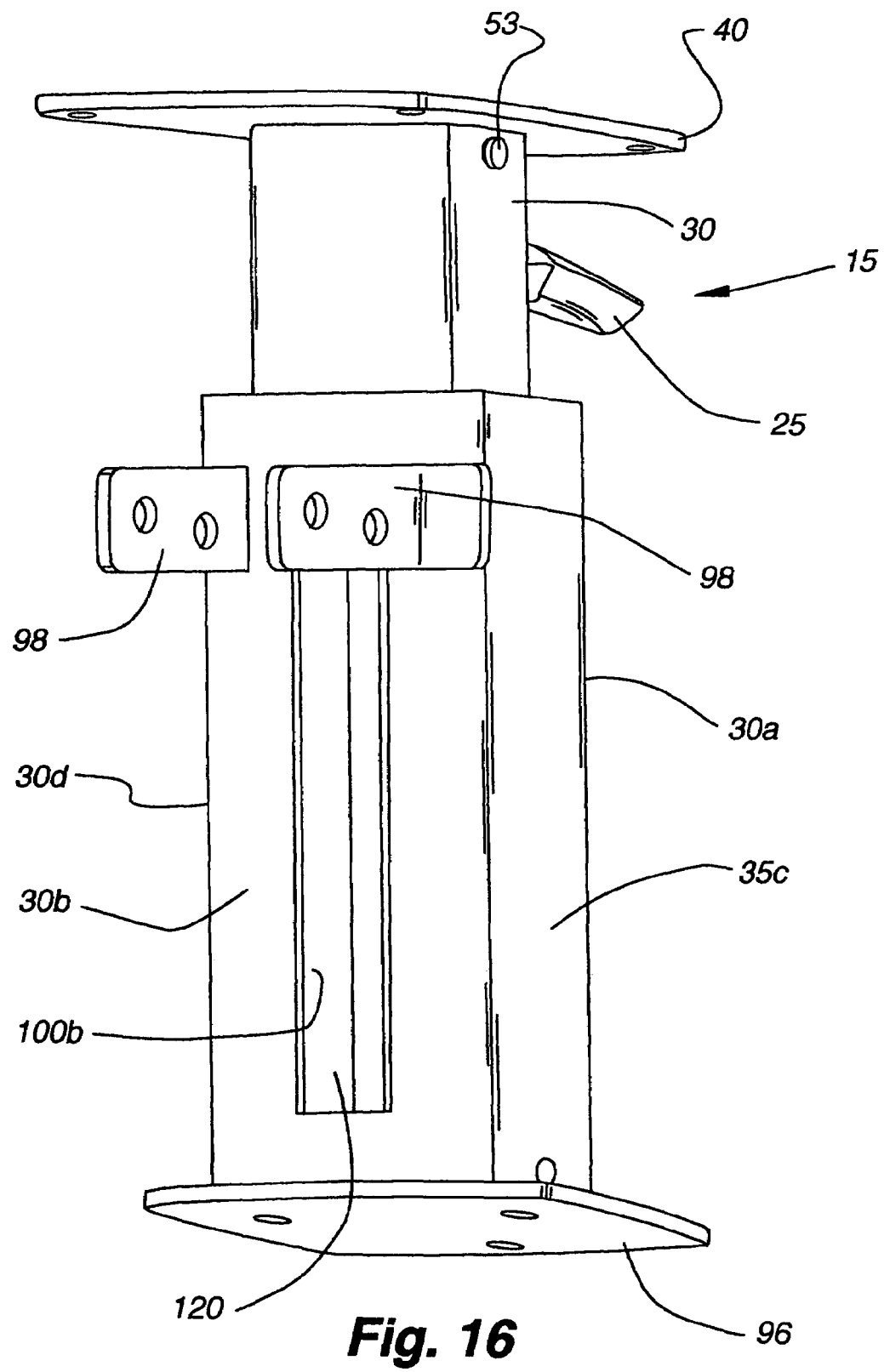
FIG. 16 is a rear-bottom isometric view of the mechanism.
Figure 17:
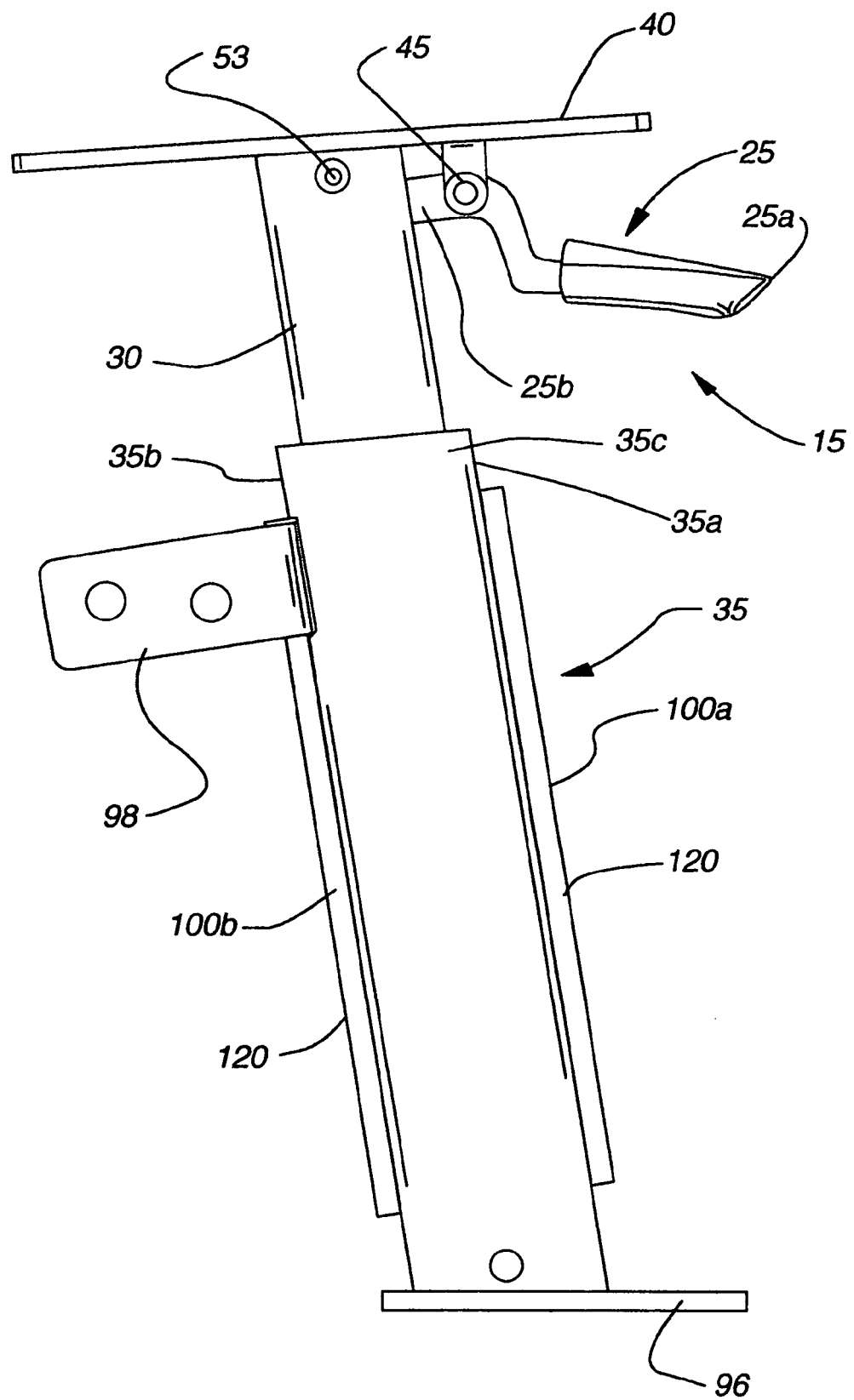
FIG. 17 is a side elevation of the mechanism.
Figure 18:
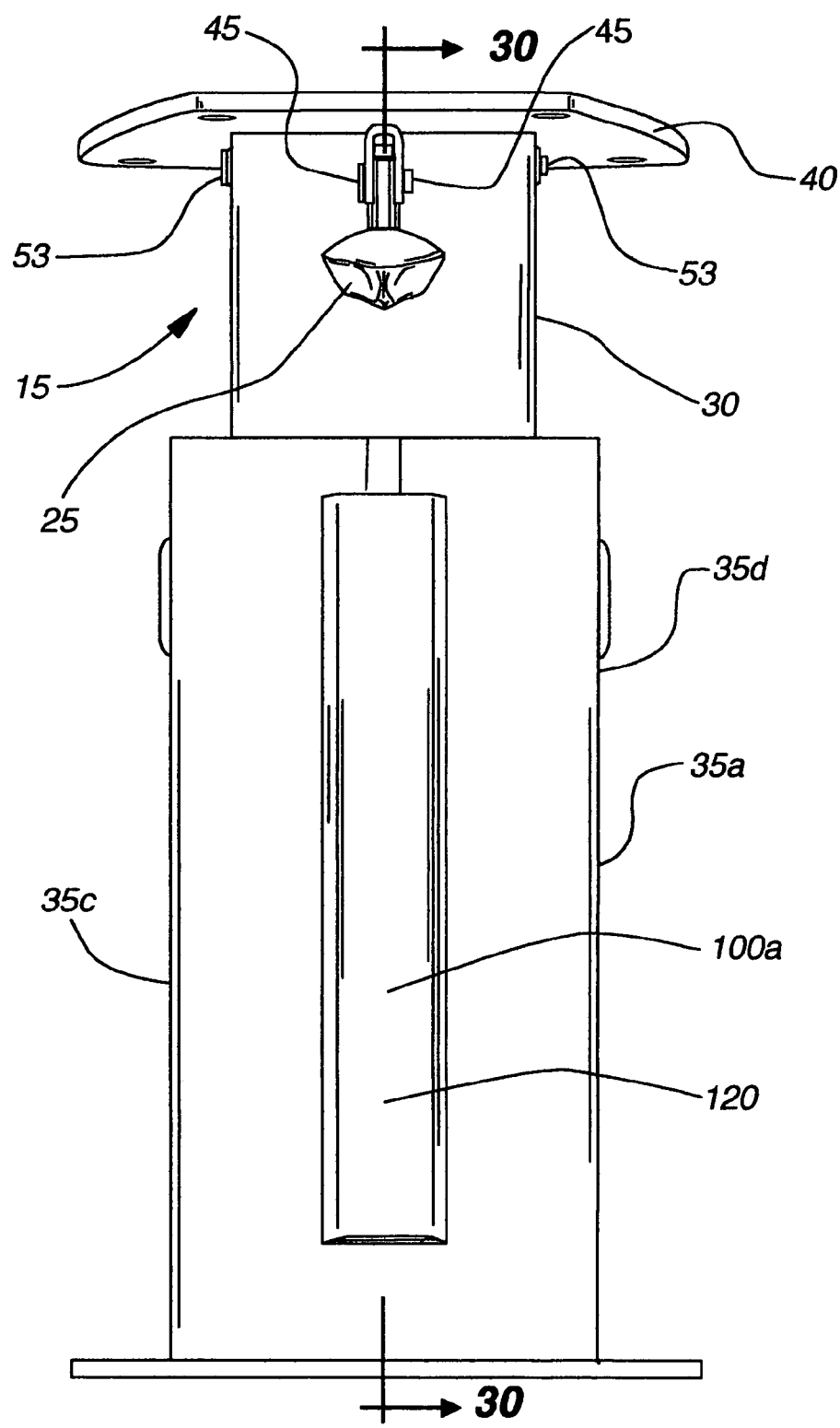
FIG. 18 is a front elevation of the mechanism.

FIG. 14 is a top-front isometric view of the seat height adjustment mechanism 15. FIG. 15 is a bottom-front isometric view of the mechanism 15. FIG. 16 is a rear-bottom isometric view of the mechanism 15. FIG. 17 is a side elevation of the mechanism 15. FIG. 18 is a front elevation of the mechanism 15.

As can be understood from FIGS. 14-18, in one embodiment, the mechanism 15 depicted in FIGS. 14-18 is substantially more structurally robust as compared to the embodiment depicted in FIGS. 1A-13. Accordingly, in one embodiment, the robustness of the embodiment depicted in FIGS. 13-18 lends itself well to resistance strength training exercise equipment 18. However, in other embodiments, the mechanism 15 depicted in FIGS. 13-18 is used for bicycle type applications.

As shown in FIGS. 14-18, the mechanism 15 includes a telescopic member 30 that is telescopically displaceable within a base, frame or housing member 35 extending generally upwardly from the frame of the exercise equipment (e.g., bicycle 10, 17 or resistance equipment 18). A seat (not shown) is coupled to an upper end of the telescopic member 30 in a manner similar to that depicted in FIGS. 1A-5, and the lower end of the telescopic member 30 is telescopically received within the base member 35.

Figure 19:
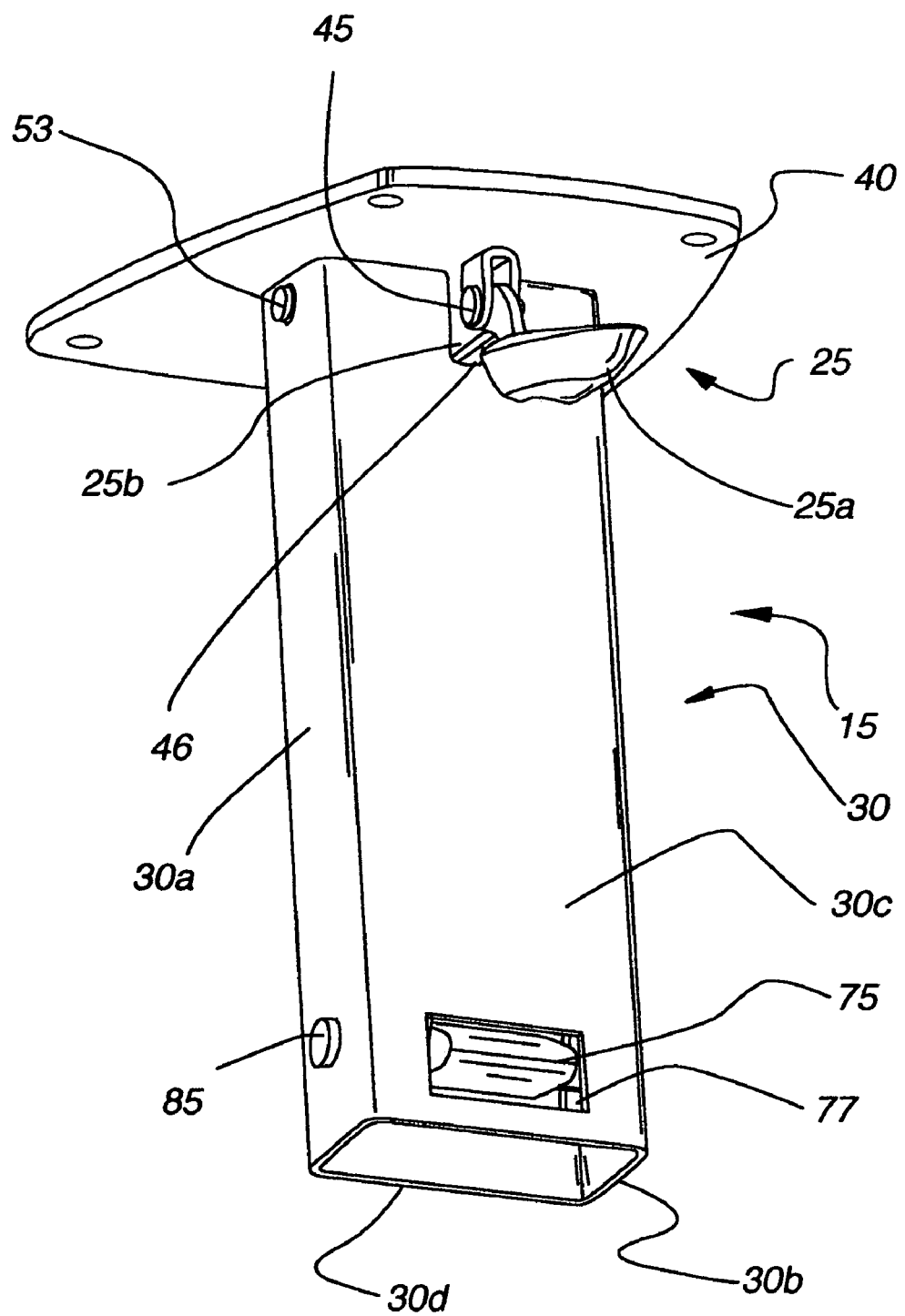
FIG. 19 is a front isometric view of the telescopic member.
Figure 20:
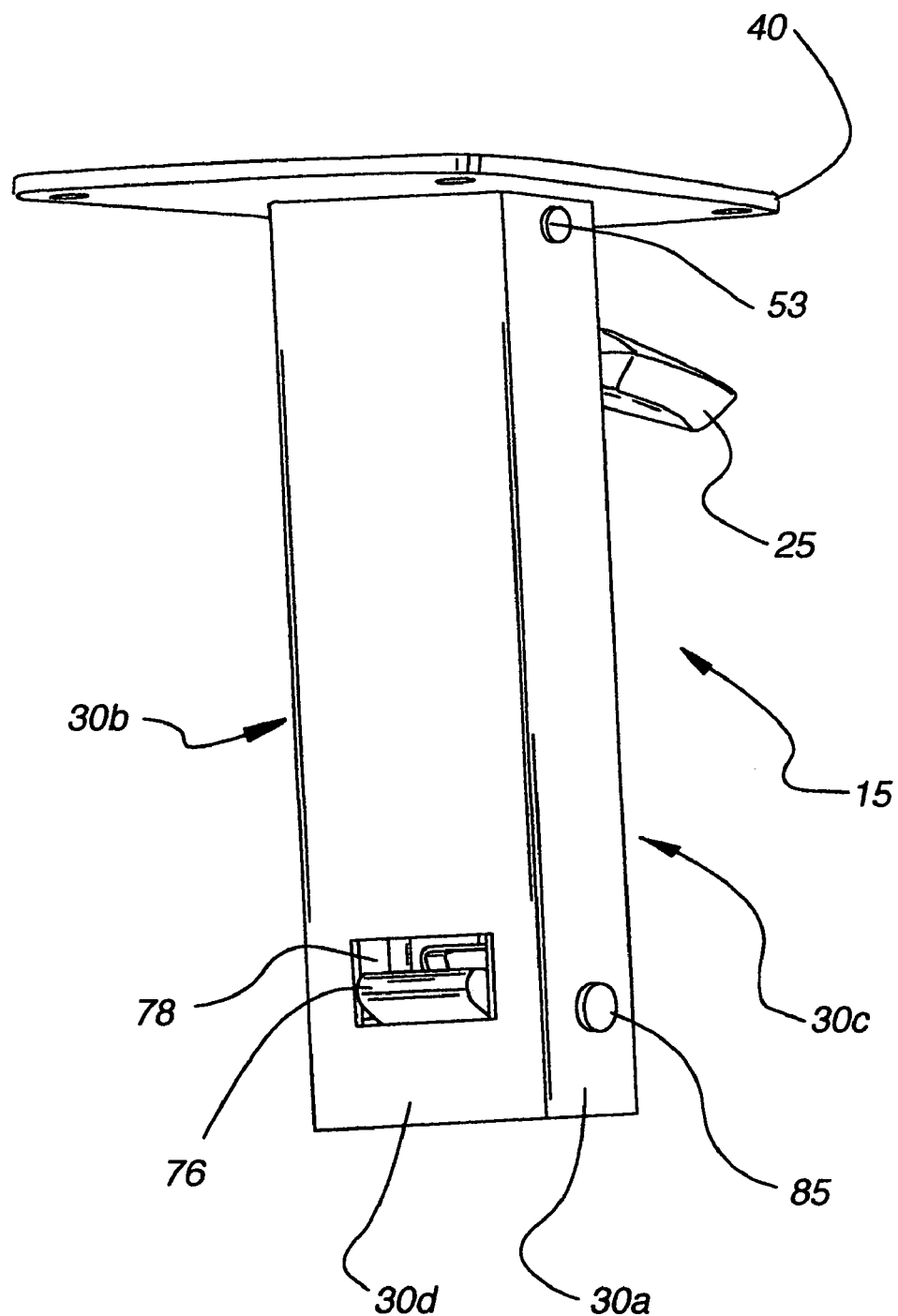
FIG. 20 a rear isometric view of the telescopic member.
Figure 21:
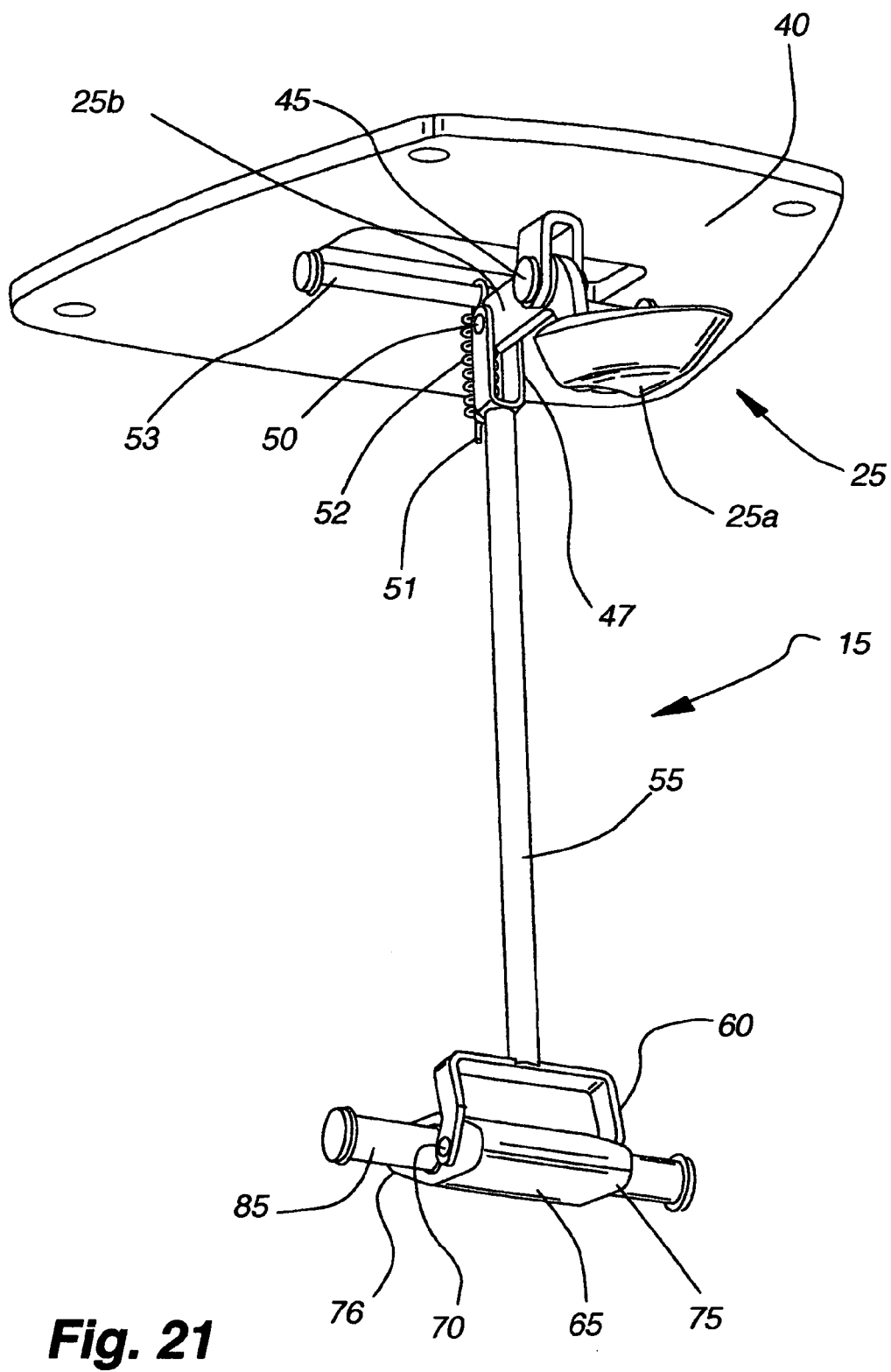
FIG. 21 is a front isometric view of the components of the mechanism that are hidden within the telescopic member.
Figure 22:
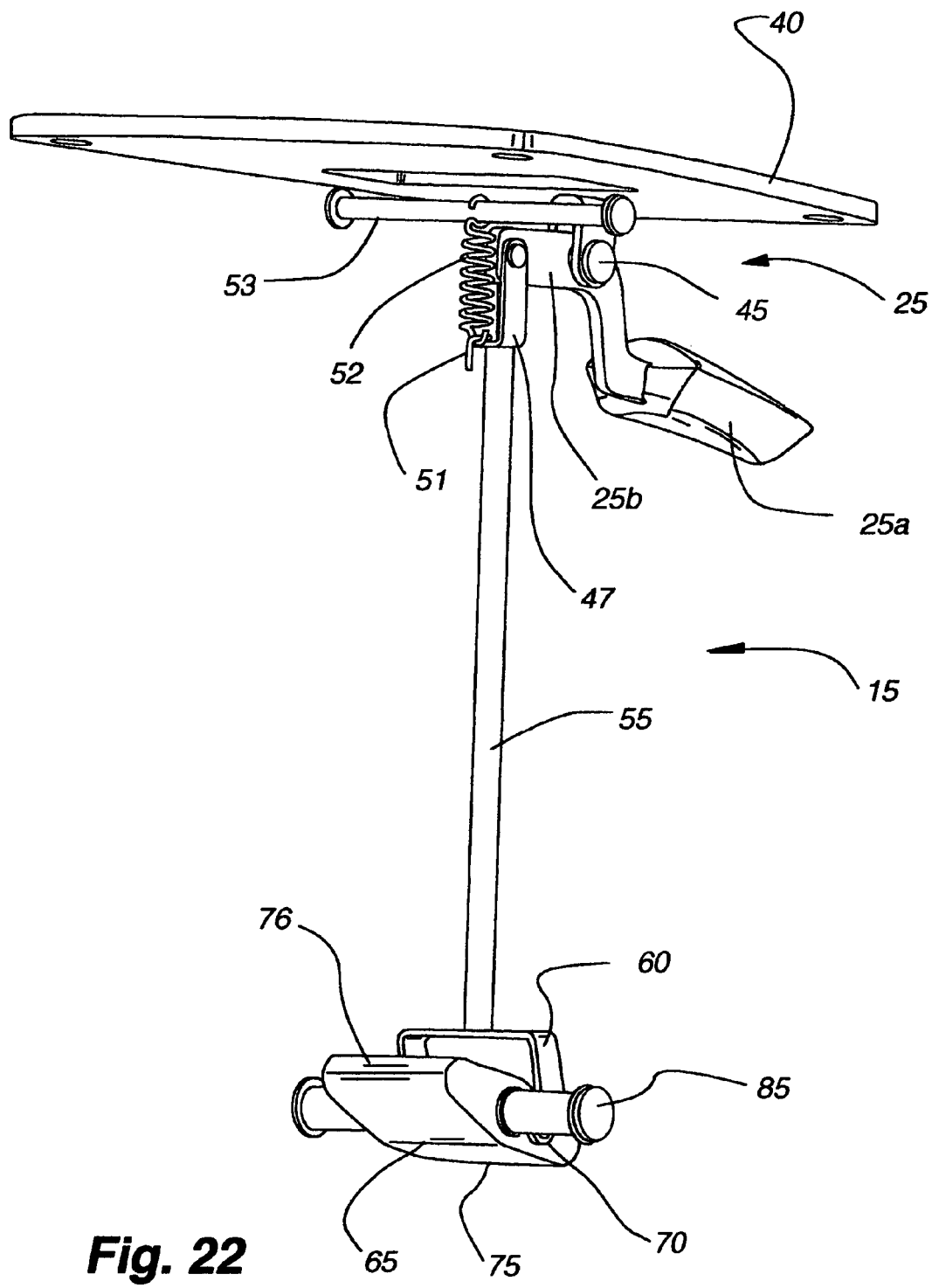
FIG. 22 is a rear isometric of the same components illustrated in FIG. 21.
Figure 23:
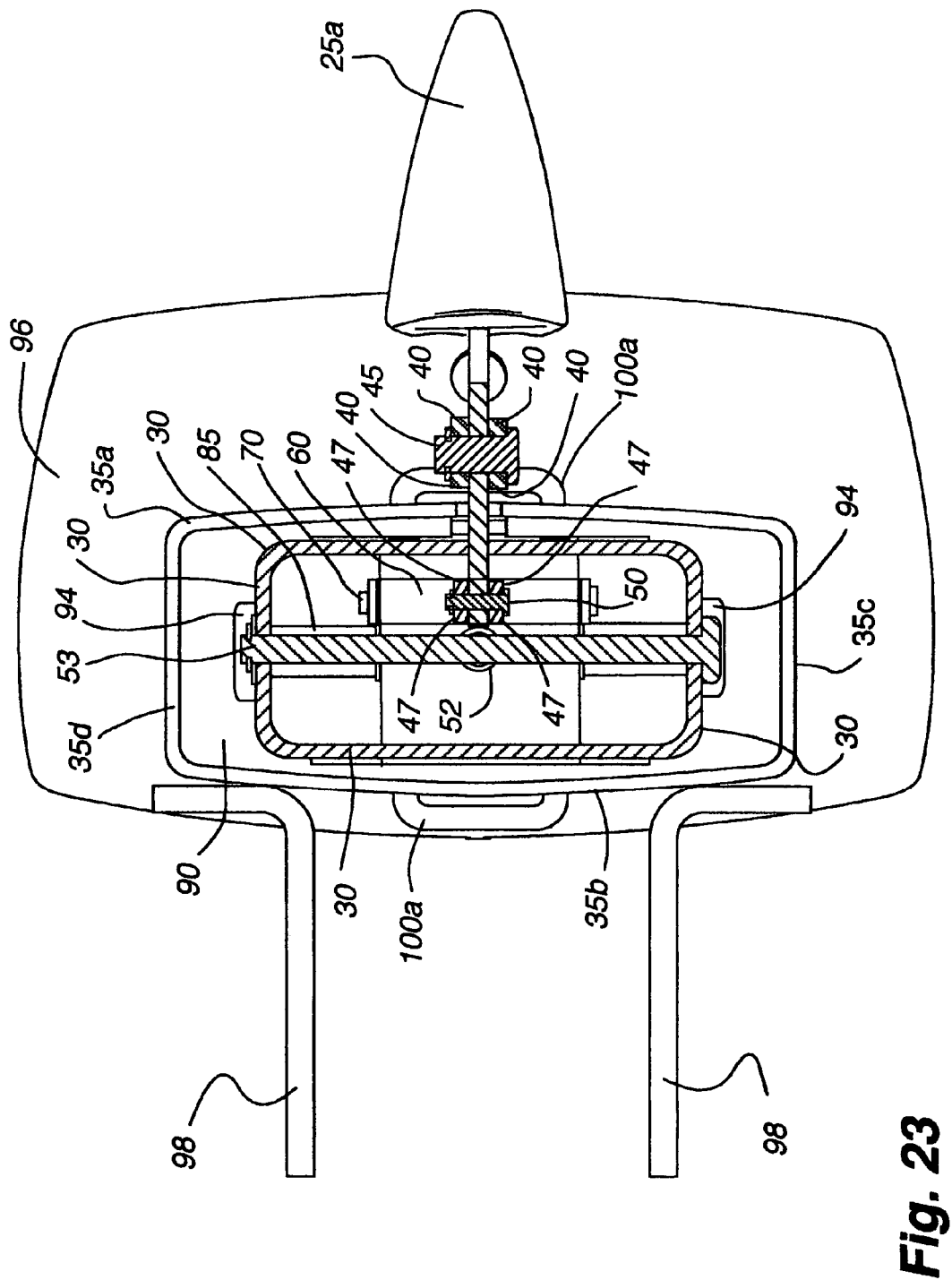
FIG. 23 is a cross-section, as taken along section line 23-23 in FIG. 30, of the telescopic member at the mechanism actuation handle.
Figure 24:
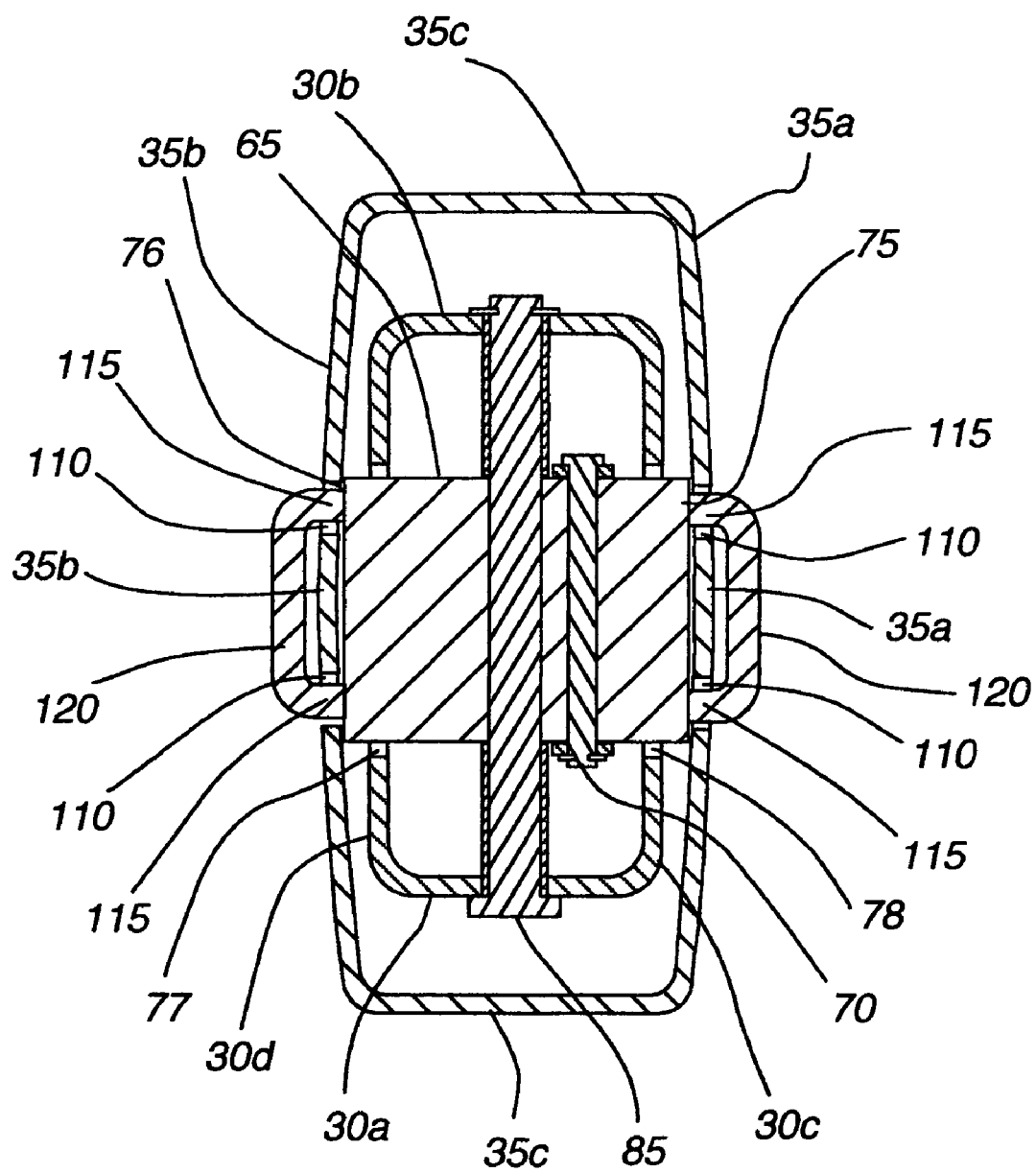
FIG. 24 is a cross-section, as taken along section line 24-24 in FIG. 30, of the telescopic and base members at the engagement member.
Figure 25:
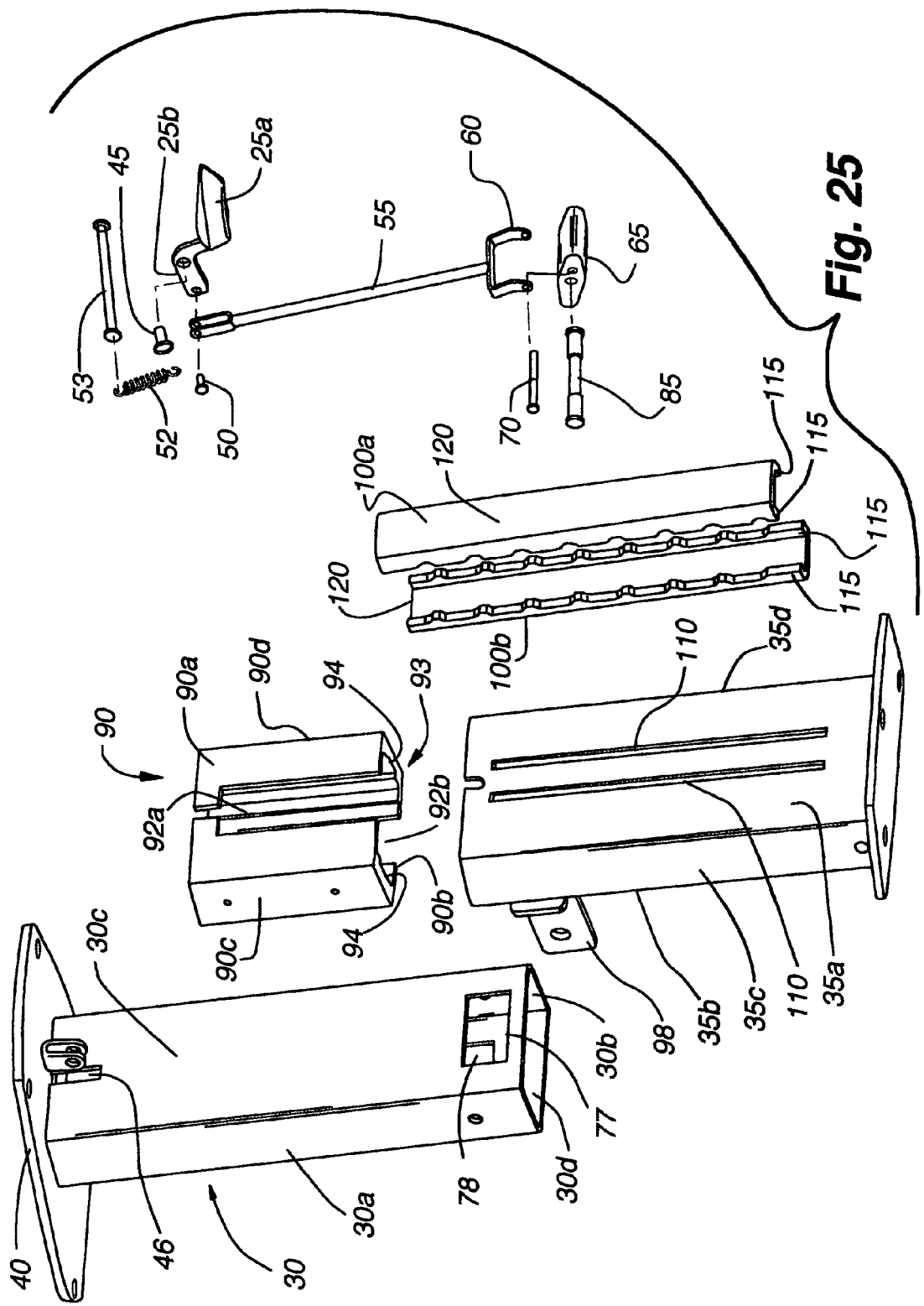
FIG. 25 is an exploded isometric view of the seat height adjustment mechanism.

For a discussion of the telescopic member 30 and the components of the mechanism 15 supported thereby, reference is made to FIGS. 19-25. FIG. 19 is a front isometric view of the telescopic member 30. FIG. 20 a rear isometric view of the telescopic member 30. FIG. 21 is a front isometric view of the components of the mechanism 15 that are hidden within the telescopic member 30. FIG. 22 is a rear isometric of the same components illustrated in FIG. 21. FIG. 23 is a cross-section, as taken along section line 23-23 in FIG. 30, of the telescopic member 30 at the mechanism actuation handle 25. FIG. 24 is a cross-section, as taken along section line 24-24 in FIG. 30, of the telescopic and base members 30, 35 at the engagement member 65. FIG. 25 is an exploded isometric view of the seat height adjustment mechanism 15.

As indicated in FIGS. 19 and 20, the upper end of the telescopic member 30 is coupled to a seat support plate 40, which is coupled to, and supports, the seat (not shown) in a manner similar to that depicted in FIGS. 1A-5. As can be understood from FIGS. 14-18, the lower end of the telescopic member 30 is telescopically received in the frame member 35. The telescopic member 30 includes opposed lateral sidewalls 30a, 30b and front and rear sidewalls 30c, 30d.

As shown in FIGS. 21-23 and 25, the mechanism actuation handle 25 is pivotally coupled to the seat support plate 40 via a pivot pin 45 and includes a forward portion 25a forward of the pivot pin 45 and a rearward portion 25b rearward of the pivot pin 45. As illustrated in FIGS. 19 and 23, the actuation handle 25 extends through an opening 46 in the front sidewall 30c near the seat plate 40. The actuation handle 25 is pivotal within the opening 46 about the pivot pin 45.

As indicated in FIGS. 21 and 22, the forward portion 25a of the mechanism actuation handle 25 is adapted to be engaged by an exerciser's hand to adjust seat height. In one embodiment, the forward portion 25a is conveniently positioned just below the front tip of the seat support plate 40 or seat to allow an exerciser to simply reach down to immediately below the seat to adjust the seat height without dismounting from the seat of the exercise equipment (e.g., bicycle 10, 17 or resistance equipment 18 as shown in FIGS. 1A-1C), contorting the body or assuming an awkward position.

In other embodiments, the forward or hand engagement portion 25a of the handle 25 is located in other convenient locations near the seat (e.g., in or near the sides or rear of the seat). Regardless of the exact location of the mechanism actuation handle 25, the mechanism actuation handle 25 moves with, and is in close proximity to, the seat. As a result, an exerciser can use a single hand to actuate the mechanism 15 via the handle 25 and lower the seat.

As depicted in FIGS. 21-23 and 25, the rear end of the rear portion 25b is pivotally coupled to a top clevis 47 via a pivot pin 50. The top clevis 47 includes a rearwardly extending ledge 51 that receives a bottom end of a spring 52. The top end of the spring 52 receives a pin 53, which, as indicated in FIGS. 15-20, is received in pinholes in the opposed lateral sidewalls 30a, 30b of the telescopic member 30.

As shown in FIGS. 21, 22 and 25, the top clevis 47 is coupled to a top end of a longitudinally extending linkage member 55, which has a bottom end that is coupled to a bottom clevis 60. The bottom clevis 60 is pivotally coupled to an engagement member 65 via a pivot pin 70. The forward end 75 of the engagement member 50 forms a forward engagement end 75 for engaging the teeth of a forward rack, as described later in this specification. The rearward end 76 of the engagement member 65 forms a rearward engagement end 76 for engaging the teeth of a rearward rack, as described later in this specification. The middle or center portion of the engagement member 65 pivotally receives a pivot pin 85, which is received in the opposed lateral sidewalls 30a, 30b of the telescopic member 30, as can be understood from FIGS. 19, 20, 24 and 25.

As indicated in FIG. 19 and 20 and as can be understood from FIGS. 21, 22 and 24, depending on how the engagement member 65 is pivotally oriented around the pivot pin 85, the engagement ends 75, 76 protrude to a greater or lesser extent from their respective openings 77, 78 in the front and rear sidewalls 30c, 30d of the telescopic member 30. As illustrated in FIGS. 19 and 20, in one embodiment the openings 77, 78 exist in the forward and rearward sidewalls 30c, 30d of the telescopic member 30 as a relatively short slots 77, 78 that are only marginally larger than the corresponding engagement ends 75, 76. In other embodiments, the openings 77, 78 will each be a substantially longer slot 77, 78 that will extend to a greater or lesser extent along the length of the corresponding front and rear sidewall 30c, 30d. In one such embodiment, each slot 77, 78 will have a length that is generally coextensive with the corresponding rack 100a, 100b.

Figure 26:
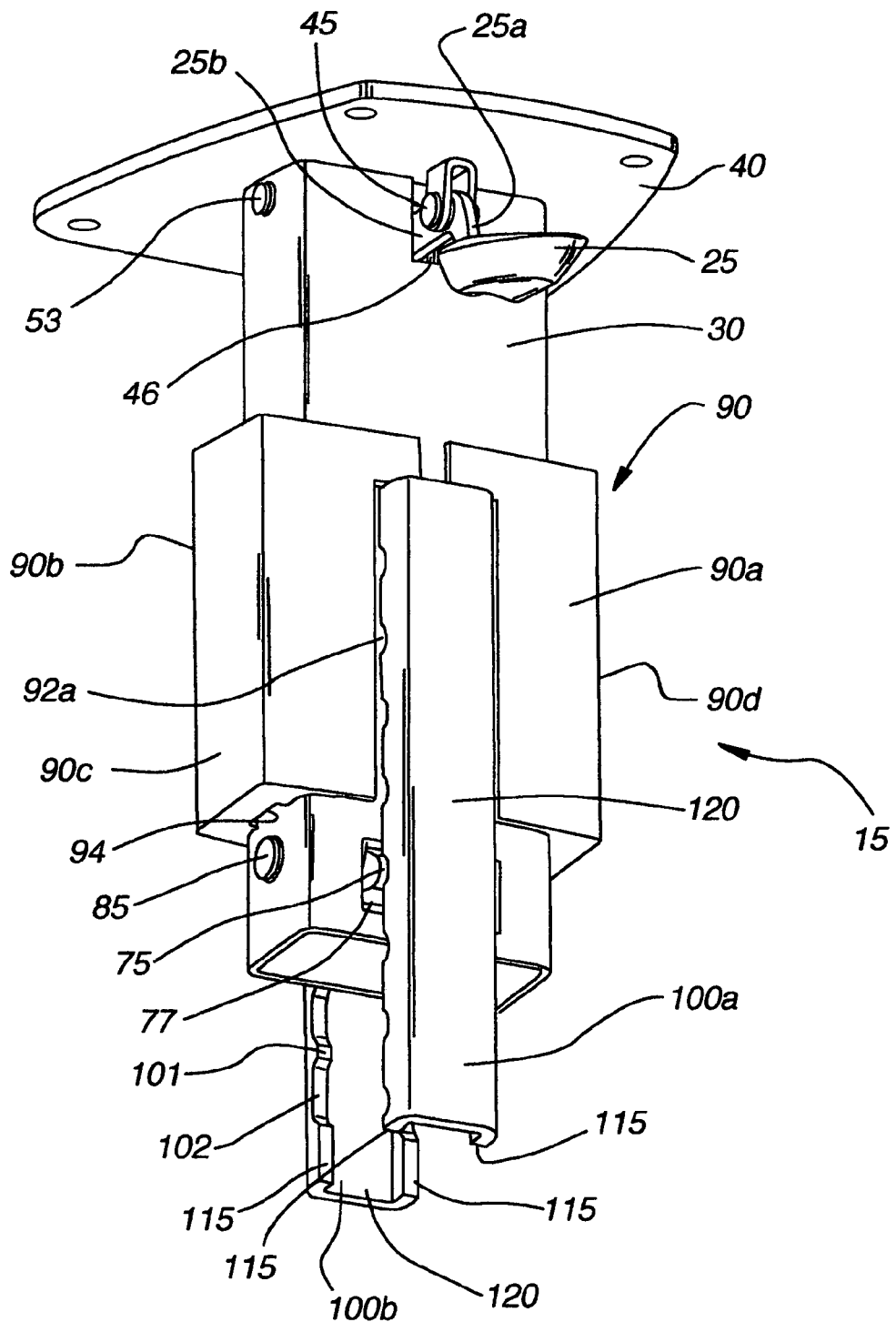
FIG. 26 is an isometric view similar to the one depicted in FIG. 19, except illustrating the mating of the sleeve and racks of the frame member with the features of the telescopic member.
Figure 27:
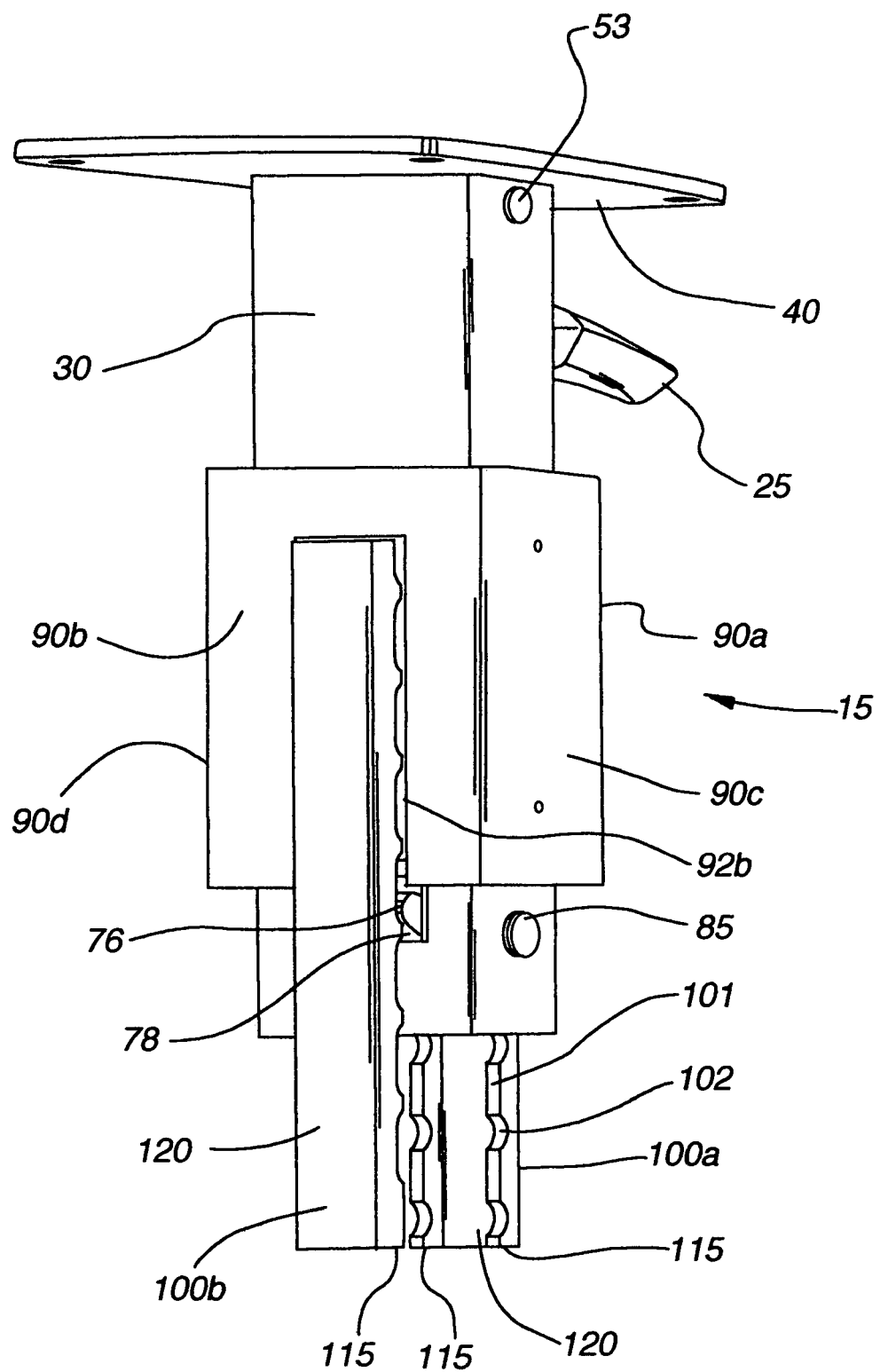
FIG. 27 is an isometric view similar to the one depicted in FIG. 20, except illustrating the mating of the sleeve and racks of the base member with the features of the telescopic member.
Figure 28:
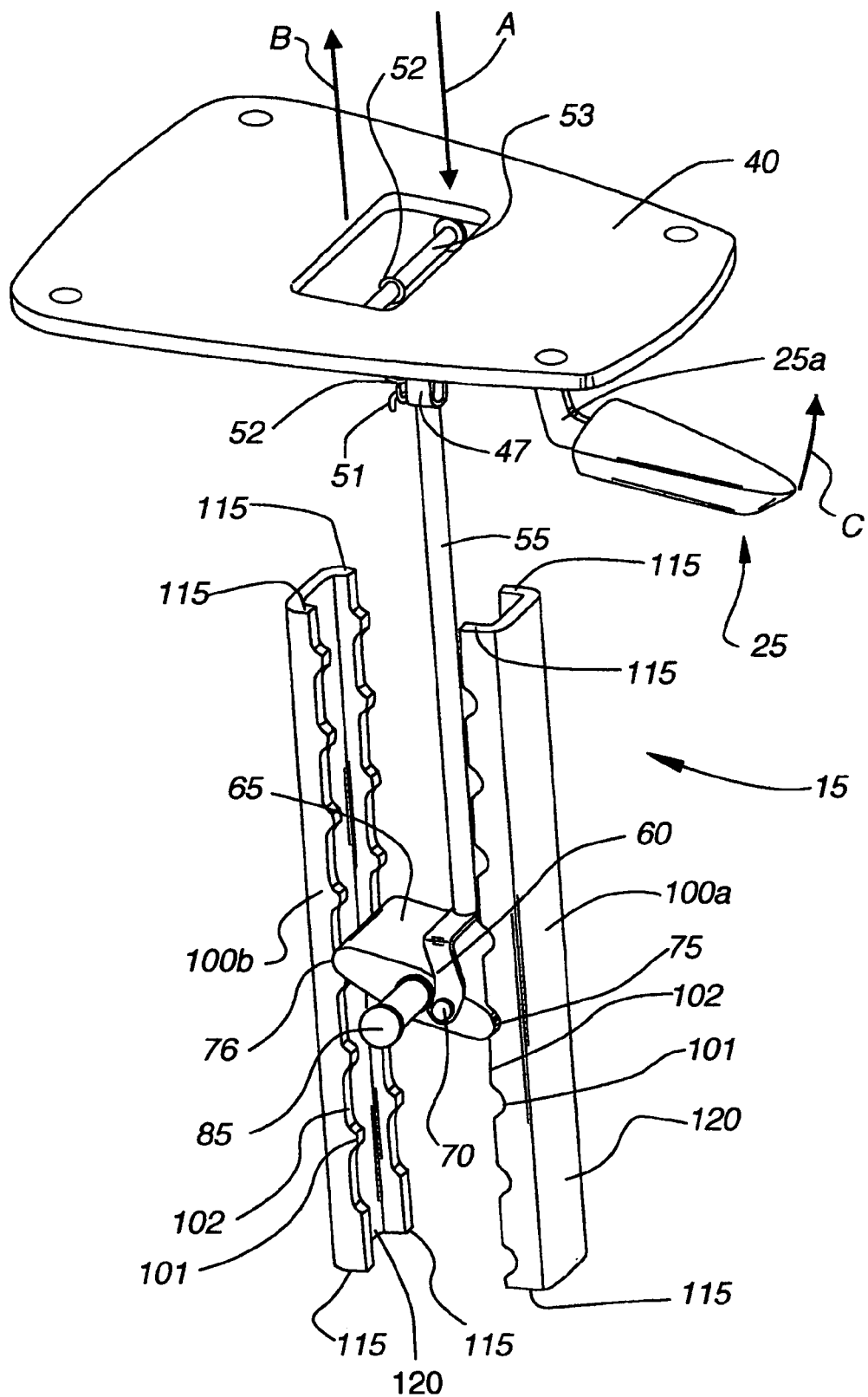
FIG. 28 is a front-side isometric view illustrating the relationship between the mechanism components of the telescopic member and the racks of the base member, wherein the engagement member is engaged with the racks.
Figure 29:
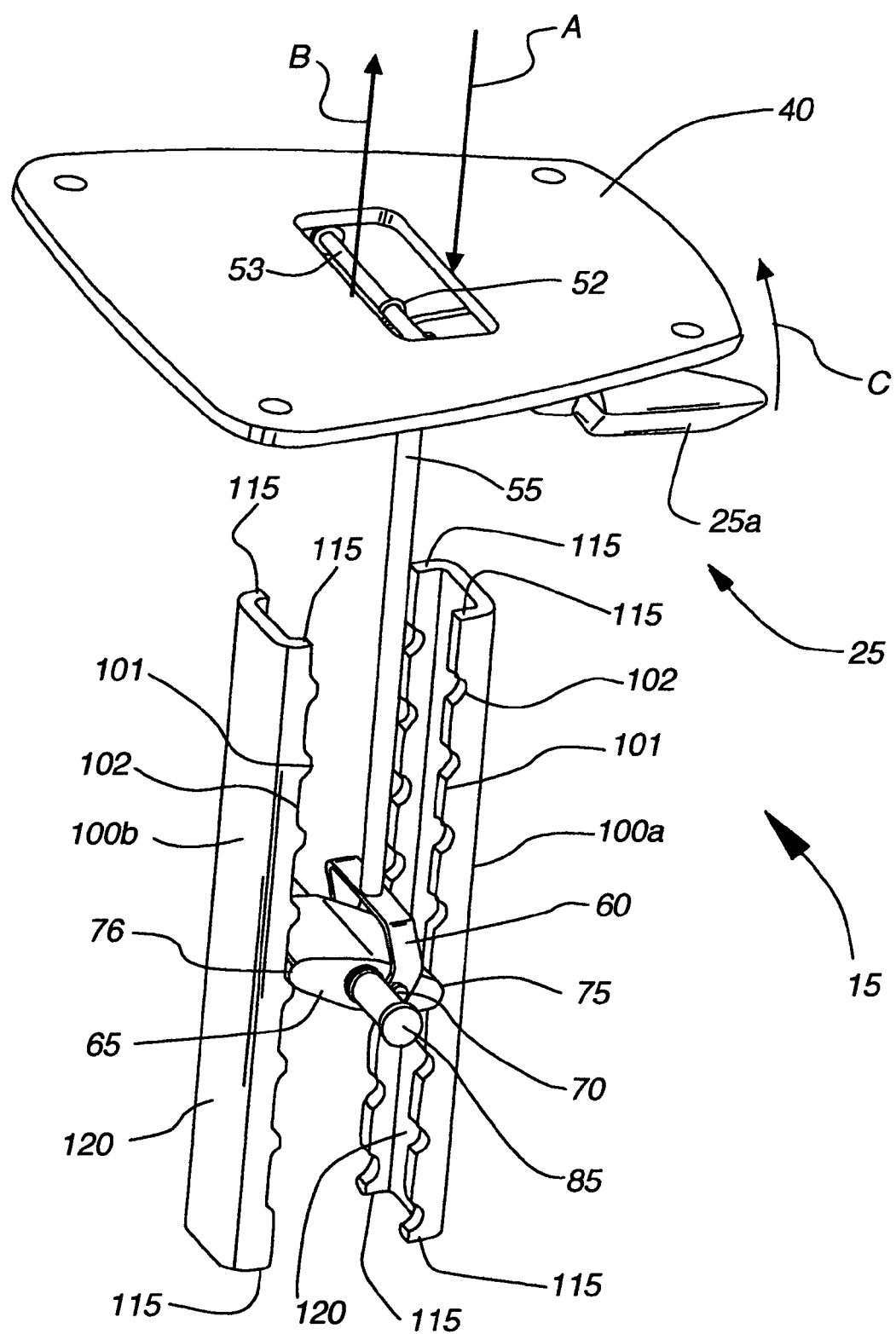
FIG. 29 is a rear-side isometric view illustrating the relationship between the mechanism components of the telescopic member and the racks of the base member, wherein the engagement member is engaged with the racks.
Figure 30:
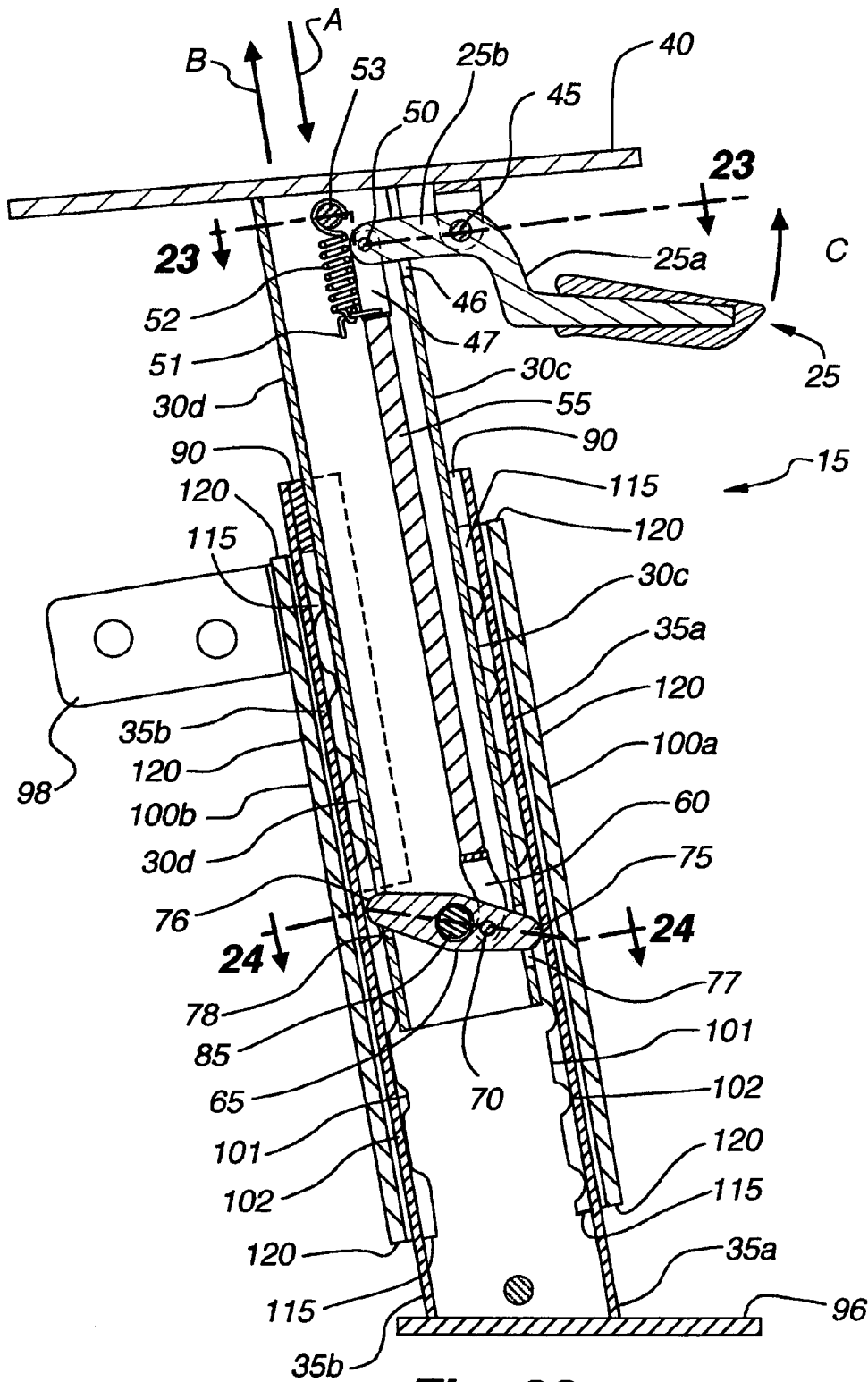
FIG. 30 is a longitudinal sectional side elevation, as taken along section line 30-30 of FIG. 18, of the seat support plate, telescopic member, base member and the components contained therein, wherein the engagement member is engaged with the racks.
Figure 31:
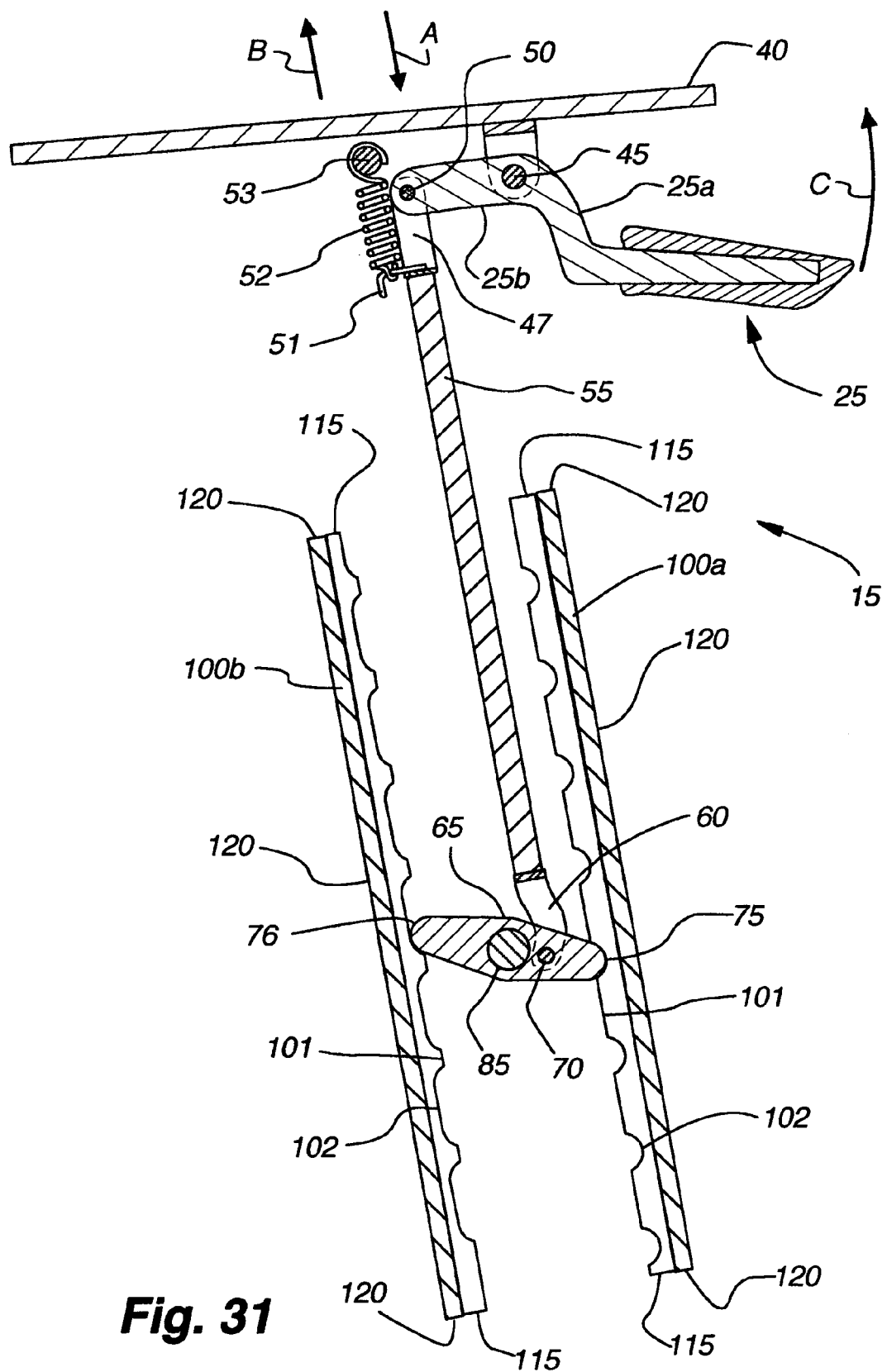
FIG. 31 is the same sectional view depicted in FIG. 30, except the telescopic member and base member are hidden for clarity purposes.
Figure 32:
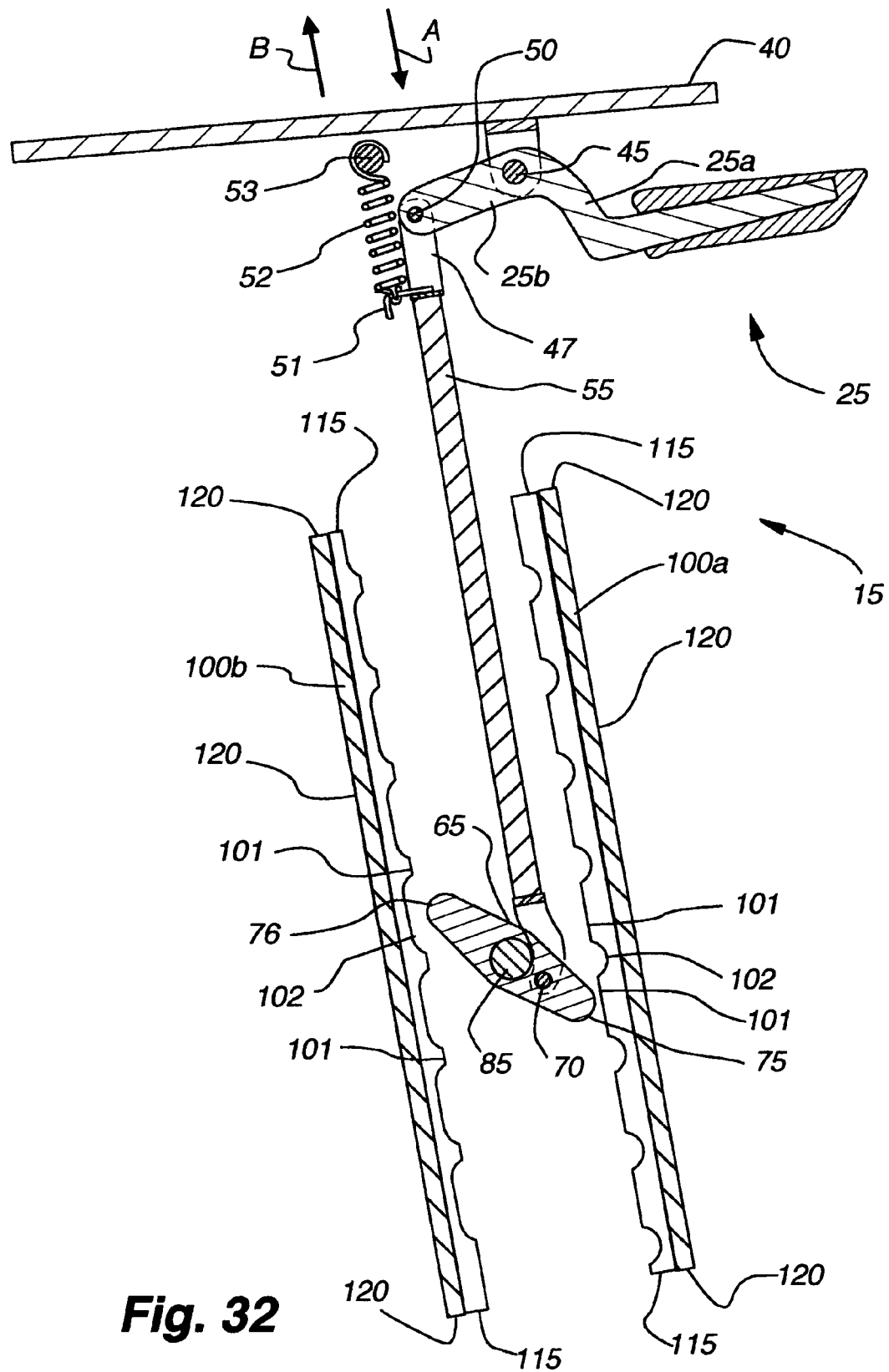
FIG. 32 is the same sectional view depicted in FIG. 31, except the engagement member is disengaged from the racks.
Figure 33:
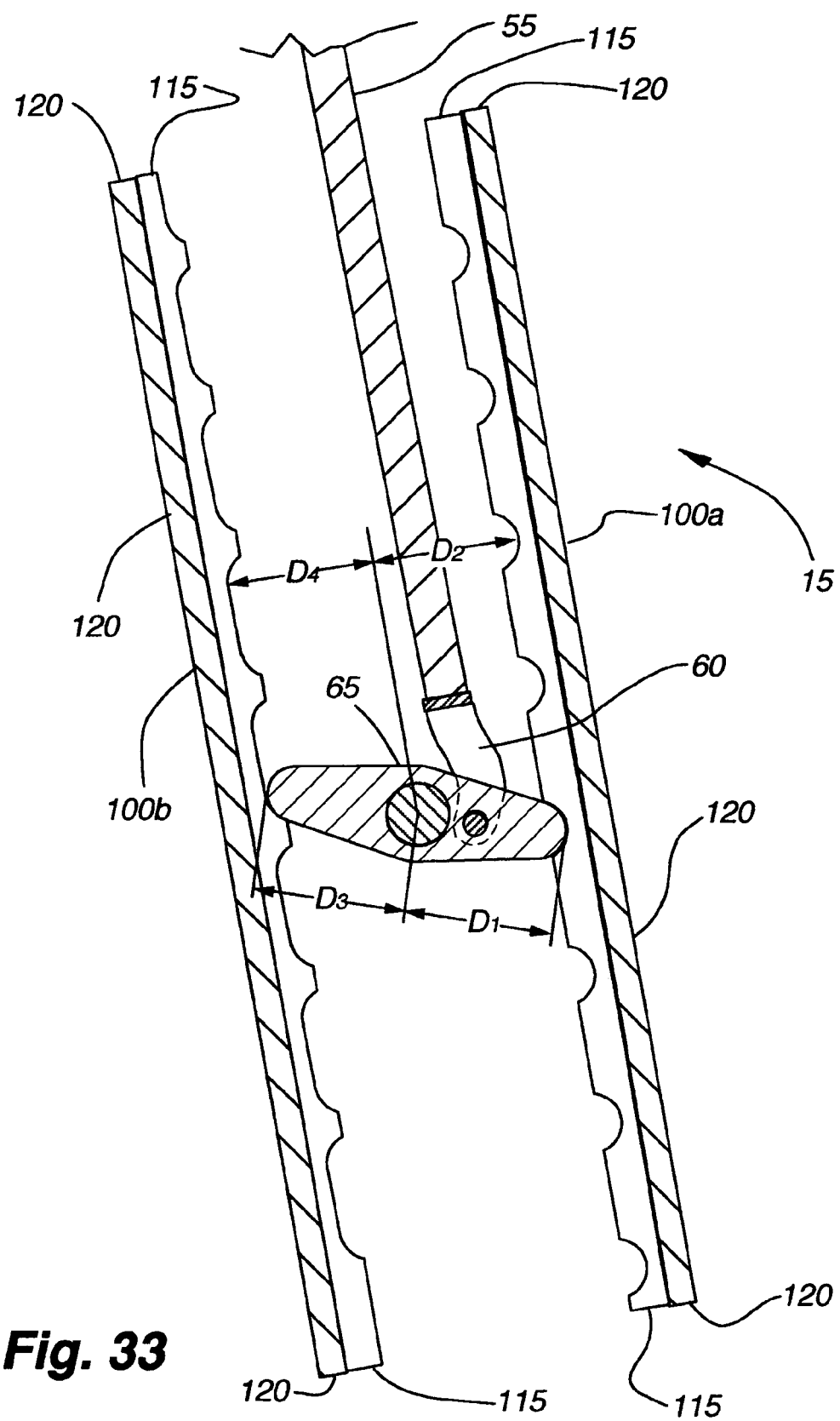
FIG. 33 is an enlarged view of the engagement member engaging the racks, as depicted in FIG. 31.

For a discussion of the components of the housing member 35 and the interaction between the components of the telescopic and housing members 30, 35, reference is made to FIGS. 23-25 and 26-33. FIG. 26 is an isometric view similar to the one depicted in FIG. 19, except illustrating the mating of the sleeve 90 and racks 100a, 100b of the base member 35 with the features of the telescopic member 30. FIG. 27 is an isometric view similar to the one depicted in FIG. 20, except illustrating the mating of the sleeve 90 and racks 100a, 100b of the base 35 member 30 with the features of the telescopic member 30. FIG. 28 is a front-side isometric view illustrating the relationship between the mechanism 15 components of the telescopic member 30 and the racks 100a, 100b of the base member 35, wherein the engagement member 65 is engaged with the racks 100a, 100b. FIG. 29 is a rear-side isometric view illustrating the relationship between the mechanism 15 components of the telescopic member 30 and the racks 100a, 100b of the base member 35, wherein the engagement member 65 is engaged with the racks 100a, 100b. FIG. 30 is a longitudinal sectional side elevation, as taken along section line 30-30 of FIG. 18, of the seat support plate 40, telescopic member 30, base member 35 and the components contained therein, wherein the engagement member 65 is engaged with the racks 100a, 100b. FIG. 31 is the same sectional view depicted in FIG. 30, except the telescopic member 30 and base member 35 are hidden for clarity purposes. FIG. 32 is the same sectional view depicted in FIG. 31, except the engagement member 65 is disengaged from the racks 100a, 100b. FIG. 33 is an enlarged view of the engagement member 65 engaging the racks 100a, 100b, as depicted in FIG. 31.

As best understood from FIGS. 14, 23, 25-27 and 30, the housing, frame or base member 35 includes a sleeve 90 that is located between the inner surfaces of the frame member 35 and the outer surfaces of the telescopic member 30. As shown in FIGS. 14, 23, 26 and 27, in one embodiment, when the telescopic member 30 is received in the housing member 35, the sleeve 90 receives the sidewalls 30a, 30b, 30c, 30d of the telescopic member 30.

As illustrated in FIGS. 23 and 25, the sleeve 90 includes front and rear exterior faces 90a, 90b and lateral exterior faces 90c, 90d. Each exterior face 90a, 90b, 90c, 90d abuts against a corresponding interior face of the base member 35 when the sleeve 90 is received in the base member 35. Each front and rear exterior face 90a, 90b includes a vertically extending slot 92a, 92b. As indicated in FIGS. 26 and 27, each slot 92a, 92b receives a rack 100a, 100b.

As shown in FIG. 25, a shaft 93 vertically extends through the sleeve 90 to slidably receive therein the telescopic member 30, as depicted in FIGS. 14, 23, 26, 27 and 30. As indicated in FIGS. 14, 23, 25 and 26, vertically extending grooves 94 are defined in the interior surfaces of the lateral sidewalls of the sleeve 90. In one embodiment, each groove 94 extends the length of the sleeve 90. As can be understood from FIGS. 26 and 27, ends of the pivot pin 85 protrude from the exterior surfaces of the lateral opposed sidewalls 30a, 30b of the telescopic member 30. As indicated in FIGS. 13, 23, 26 and 27, the grooves 94 provide clearance for the ends of the pivot pin 85 as the telescopic member 30 telescopically slides within the shaft 93 of the sleeve 90.

As shown in FIGS. 14-18, in one embodiment, the housing, frame or base member 35 includes a base or floor plate 96 and a pair of attachment members 98. In the context of the mechanism 15 being employed as part of resistance weight training equipment 18, the floor plate 96 supports the base member 35 off of the floor, and the attachment members 98 are used to couple the base member 35 to the resistance weight training equipment 18.

As indicated in FIGS. 14-18, the base member 35 includes front and rear sidewalls 35a, 35b and opposed lateral sidewalls 35c, 35d. The front and rear sidewalls 35a, 35b each include a rack 100a, 100b. As shown in FIGS. 24-29, each rack 100a, 100b includes a pair of teeth ridges 115 extending the length of the rack 100a, 100b and joined together via a back portion 120 of the rack 100a, 100b. As can be understood from FIGS. 24 and 25, the front and rear sidewalls 35a, 35b of the base member 35 each include a pair of slots 110 through which the teeth ridges 115 of each rack 100a, 100b extend when the racks 100a, 100b are mounted on their respective sidewalls 35a, 35b.

As indicated in FIGS. 25-33, in one embodiment, each rack 100a, 100b employs cog-like teeth 101. In one embodiment, the forward rack 100a employs a tooth profile having generally planar ridge tops 101 of a rather substantial length that are separated at regular intervals by rather short curved valleys 102 that are generally the exact mating inverse of the forward end 75 of the engagement member 65. When the forward end 75 of the engagement member 65 mates with the forward rack 100a, the forward end 75 is received in a valley 102, as shown in FIGS. 26-31 and 33.

In one embodiment, the rearward rack 100b employs a tooth profile having generally planar ridge tops 101 of a rather short length that are separated at regular intervals by rather long valleys 102 that are substantially longer than the rearward end 76 of the engagement member 65. When the rearward end 76 of the engagement member 65 mates with the rearward rack 100b, the rearward end 76 is received in a valley 102, as shown in FIGS. 26-31 and 33.

While FIGS. 26-33 depict racks 100a, 100b employing cog-like gear teeth profiles, in other embodiments, other gear profiles will be employed. For example, in one embodiment, each gear rack 100a, 100b will employ a gear profile similar to that depicted in FIGS. 6-10. In other embodiments, the gear teeth profile will employ gear teeth 101 of a relatively fine triangular profile. In other embodiments, the racks 100a, 100b will employ a generally planar surface against which the forward and rearward ends 75, 76 will cam.

As can be understood from FIGS. 24, 26-31 and 33, in one embodiment, the forward engagement end 75 is oriented towards the forward rack 100a in a downward direction, and the rearward engagement end 76 is oriented towards the rearward rack 100b in an upward direction. As indicated in FIGS. 30 and 31, the spring 52 biases the linkage member 55 upwardly, which tends to pivot the engagement ends 75, 76 of the engagement member 65 into engagement with the teeth 101 or valleys 102 of the racks 100a, 100b. The biasing force of the spring 52 is adequate to engage the engagement member 65 with the teeth 101 or valleys 102 of the racks 100a, 100b to prevent downward displacement of the telescopic member 30 in the housing member 35. The downward force (as indicated by arrow A) exerted on the telescopic member 30 by the weight of the seat, not to mention the weight of the exerciser seated on the seat, increases the magnitude of the engagement between the engagement ends 75, 76 of the engagement member 65 and the teeth 101 or valleys 102 of the gear racks 100a, 100b.

As best understood from FIG. 33, the engagement member 65 is placed into a bind against the racks 100a, 100b via the biasing force of the spring 52 and any downward force exerted on the linkage member 55 (e.g., the weight of the seat and the exerciser seated on the seat) because of the downward orientation of the forward engagement end 75 and because: (1) the distance $D_1$ between the forward engagement end 75 and the pivot pin 85 is greater than the distance $D_2$ between the pivot pin 85 and the forward gear rack 100a; and (2) the distance $D_3$ between the rearward engagement end 76 and the pivot pin 85 is greater than the distance $D_4$ between the pivot pin 85 and the rearward gear rack 100b. The bind prevents the engagement member 65 from pivoting any further counterclockwise about the pivot pin 85, as viewed in FIG. 33, once the engagement ends 75, 76 of the engagement member 65 have engaged the teeth 101 or valley 102 of the corresponding racks 100a, 100b. As a result, the linkage member 55 and the attached telescopic member 30 are prevented from displacing downwardly into the housing member 35. Thus, the seat support plate 40 and the seat cannot be lowered without disengaging the engagement feature 65 from the racks 100a, 100b via actuation of the handle 25, as described below.

As can be understood from FIGS. 28-31 and 33, because the forward engagement end 75 is oriented in a downward direction, the rearward engagement end 76 is oriented in an upward direction, and the valleys 102 on the rearward rack 100b are relatively wide as compared to the width of the rearward engagement end 76, the telescopic member 30 and seat can be raised by simply exerting an upward force (as indicated by arrow B) on the seat, seat support plate 40 or telescopic member 30; actuating the handle 25 to disengage the engagement member 65 from the racks 100a, 100b is not required to move the seat upwardly.

Exerting the upward force (arrow B) on the seat, seat support plate 40 or telescopic member 30 causes the engagement member 65 to displace upwardly along the racks 100a, 100b in a ratchet like manner. Specifically, as the engagement member 65 moves upwardly along the forward rack 100a, the forward engagement end 75, because of its downward orientation, is able to pivot downwardly about the pivot pin 85 to clear each encountered rack tooth 101 of the forward rack 100a. As the engagement member 65 pivots such that the forward engagement end 75 clears a tooth 101 on the forward rack 100a, the rearward engagement end 76 is caused to clear a tooth 101 on the rearward rack 100b.

Since the engagement member 65 is biased by the spring 52 to pivot about the pivot pin 85 in a counterclockwise manner (as viewed in FIGS. 30 and 31), as the forward engagement end 75 clears a tooth 101 of the forward rack 100a, the forward engagement end 75 pivots upwardly to nestle into a space 102 between tooth tips 101 of the forward rack 100a prior to riding up the slope of the next tooth 101 on the forward rack 100a. Simultaneously, the rearward engagement end 76 pivots downwardly to nestle into a space 102 between tooth tips 101 of the rearward rack 100b prior to being caused to clear the next tooth tip 101 on the rearward rack 100b. Thus, the seat is free to ratchet upwardly via the configuration of the mechanism 15, without having to disengage the engagement member 65 from the racks 100a, 100b via the actuation handle 25. In other words, due to the configuration of the mechanism 15, it is not necessary to use the handle 25 to cause the engagement member 65 to break contact with the racks 100a, 100b to allow the seat to be displaced upwardly.

As can be understood from FIGS. 28-33, to lower the seat, the exerciser unweights the seat to relieve the bind between the engagement member 65 and racks 100a, 100b and pulls the forward portion 25a of the actuation handle 25 upwardly, as indicated by arrow C. The upward force, as indicated by arrow C, causes the actuation handle 25 to pivot counterclockwise (as viewed in FIGS. 30-32) against the biasing force of the spring 52 to become positioned as indicated in FIG. 32. The counterclockwise rotation of the handle 25 forces the linkage member 55 downwardly, which causes the engagement member 65 to pivot downwardly (i.e., clockwise as viewed in FIGS. 30-32) about the pivot pin 85 to become positioned as depicted in FIG. 32. As a result, the engagement ends 75, 76 of the engagement member 65 are caused to disengage from the teeth 101 of the racks 100a, 100b (see FIG. 32) as the telescopic member 30 is lowered into the housing, base or frame member 35. In one embodiment, the disengagement caused by operating the handle 25 is such that the engagement ends 75, 76 break contact with the racks 100a, 100b.

When the exerciser has positioned the seat at the appropriate height, the actuation handle 25 is released, thereby allowing the spring 52 to bias the engagement member 65 back into binding engagement with the racks 100a, 100b, as positioned in FIGS. 28-31 and 33, to prevent further downward displacement of the seat support plate 40 and seat. As previously mentioned, due to the mechanism actuation handle 25 moving with, and being in close proximity to, the seat support plate 40 and seat, an exerciser can use a single hand to actuate the mechanism 15 via the handle 20 and lower the seat support plate 40 and seat.

The preceding discussion has been concerned with an embodiment wherein the racks 100a, 100b are located on the front and rear side walls 30c, 30d, the engagement member 65 is oriented to engage the racks 100a, 100b in such locations, the racks 100a, 100b have gear or cog-like teeth 101 that are flat-tipped and separated by rounded valleys or spaces 102, the spaces 102 between the teeth 101 of the rearward rack 100b are substantially longer than the spaces 102 of the forward rack 100a, the flat tips of the teeth 101 of the rearward rack 100b are substantially shorter than the flat tips of the teeth 101 of the forward rack 100a, and the engagement member 65 is adapted to engage such gear or cog-like teeth 101. However, in other embodiments, the racks 100a, 100b are located on the lateral sidewalls 30d, 30a, 30b and the engagement member 65 is oriented to engage the racks 100a, 100b where so located. In one embodiment, the gear racks 100a, 100b are equipped with sharp, pointed or triangular profile teeth 101 and the engagement member 65 is adapted to engage such triangular profile teeth 101. In other embodiments, the teeth 101 will have other teeth and groove profiles. In one embodiment, the rack 100 and its teeth 101 are formed of mild steel. In other embodiments, the rack 100 and teeth 101 are formed of other types of steel, aluminum, polymers, composites, or etc.

In one embodiment, the racks 100a, 100b do not have teeth 101, but are instead generally planar resilient polymer strips or polymer strips with high coefficients of friction. In such an embodiment, the engagement member 65 is a cam adapted to wedge/cam against the polymer strips 100a, 100b to prevent the cam-like engagement member 65 from displacing relative to the polymer strips 100a, 100b, thereby preventing the telescopic member 30 from displacing into the housing, frame or base member 30. In other embodiments, the racks 100a, 100b will be any other surface types and of any other material types, and the engagement member 65 will be configured to engage against such surfaces 100a, 100b to prevent downward displacement of the seat support plate 40 and seat. In other embodiments, the one rack 100 will be a gear tooth equipped rack, the other rack 100 will be a planar strip rack, and the engagement member 65 will be adapted to engage both racks 100a, 100b accordingly.

Figure 34:
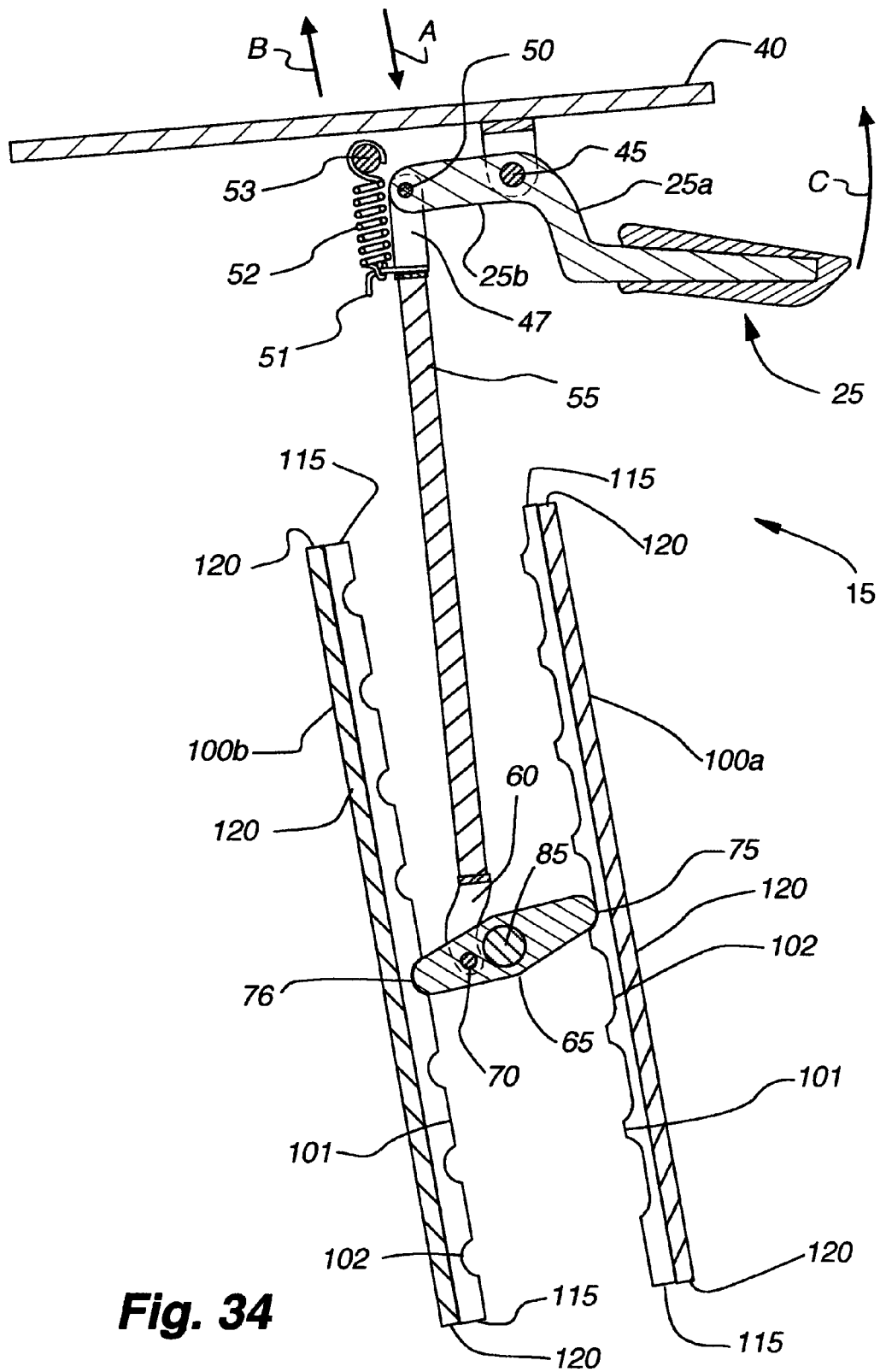
FIG. 34 is a view similar to FIG. 31, except of another embodiment.

FIGS. 28-33 depict an embodiment of the mechanism 15 wherein the linkage pivot pin 70, which couples the linkage 55 to the engagement member 65, is located between the forward end 75 of the engagement member 65 and the main pivot pin 85 of the engagement member 65. However, as depicted in FIG. 34, which is a view similar to FIG. 31, except of another embodiment, the mechanism 15 is configured such that the linkage pivot pin 70 is located between the rearward end 76 of the engagement member 65 and the main pivot pin 85 of the engagement member 65. Other mechanism configurations are possible without departing from the scope of the subject matter of this specification.

d. Conclusion

As can be understood from the preceding discussion, the various embodiments of the mechanism 15 offer at least the following advantages. First, the mechanism 15 provides fine seat height adjustment increments, which allows an exerciser to fine tune the seat height to his needs. In one embodiment, this first advantage is, in part, made possible because the mechanism employs one or more racks 100, 100a, 100b with many relatively fine teeth 101 extending the length of the one or more racks 100, 100a, 100b, and the engagement member 65 is capable of engaging any of these teeth 101.

In another embodiment, the first advantage is, in part, made possible because the mechanism 15 employs one or more racks 100, 100a, 100b that are generally planar strips of polymer material, and the engagement member 65 is a cam 65 adapted to engage the one or more strips 100, 100a, 100b at any point along the length of the strips 100, 100a, 100b. Such an embodiment also provides the additional benefit of reduced operational noise, as compared to the gear-equipped embodiment.

Second, the configuration of the mechanism 15 allows an exerciser to adjust the seat height while assuming an exercise position on a piece of exercise equipment (e.g., bicycle 10, 17 or resistance equipment 18) and without having to dismount, contort the body or assume awkward positions. This advantage is, in part, made possible by the ratchet feature of the mechanism 15 and the actuation handle 25 being located near, and being movable with, the seat 20.

While the first embodiment depicted in FIGS. 1A-13 is shown with a signal rack 100, other embodiments will employ two or more racks 100. Similarly, while the second embodiment depicted in FIGS. 14-34 is show with two racks 100a, 100b, other embodiments will employ a single rack 100a or more than two racks 100a, 100b. Various features of the two embodiments depicted in FIGS. 1A-34 may be combined or substituted to arise at other embodiments without departing from the spirit of the mechanism disclosed in this specification.

Although the present invention has been described with reference to preferred embodiments, persons skilled in the art will recognize that changes may be made in form and detail without departing from the spirit and scope of the invention.

What is claimed is:

1. A seat height adjustment mechanism for exercise equipment including a seat, the mechanism comprising:
   a member extending upwardly and inclined rearwardly and including a first rack disposed at a front thereof;
   a telescopic member telescopically movable relative to the member and operatively associated with the seat;
   an engagement member pivotally coupled to the telescopic member at a first pivot point and adapted to engage the rack;
   a linkage member extending along the telescopic member and pivotally coupled to the engagement member at a second pivot point; and
   a mechanism actuation handle proximate a front portion of the seat, wherein an upper end portion of the linkage member is coupled to an end of the mechanism actuation handle and a lower end portion of the linkage member is pivotally coupled to the engagement member, and the linkage member couples to the engagement member between the pivot point of the engagement member and a rack engaging tip of the engagement member.

2. The mechanism of claim 1, wherein a spring biases the engagement member into engagement with the first rack.

3. The mechanism of claim 1, wherein the mechanism actuation handle is pivotal relative to the telescopic member.

4. The mechanism of claim 1, wherein a portion of the mechanism actuation handle extends into the telescopic member via an opening in the telescopic member.

5. The mechanism of claim 1, wherein at least a portion of the mechanism actuation handle is under the seat.

6. The mechanism of claim 1, wherein at least a portion of the linkage member extends inside the telescopic member.

7. The mechanism of claim 1, wherein the telescopic member is displaceable upwardly without actuating the mechanism actuation handle to disengage the engagement member from the first rack.

8. The mechanism of claim 7, wherein the engagement member ratchets along the first rack as the telescopic member is displaced upwardly.

9. The mechanism of claim 7, wherein actuating the mechanism actuation handle to disengage the engagement member from the first rack allows the telescopic member to displace downwardly.

10. The mechanism of claim 1, wherein the exercise equipment comprises a stationary exercise bicycle.

11. The mechanism of claim 1, wherein the telescopic member is telescopically received in the member.

12. The mechanism of claim 1, wherein the first rack is disposed on an inner front wall of the member.

13. The mechanism of claim 1, wherein the telescopic member includes an opening and the engagement member extends through the opening to engage the rack.

14. The mechanism of claim 1, wherein the engagement member is adapted to engage the rack from a rear side thereof.

* * * * *